(12) United States Patent
Goldman et al.

(10) Patent No.: US 12,390,998 B2
(45) Date of Patent: Aug. 19, 2025

(54) SCANNED DLP WITH PIXEL DRIFT

(71) Applicant: Formlabs Inc., Somerville, MA (US)

(72) Inventors: Andrew Goldman, Stow, MA (US); Robert Morgan, Arlington, MA (US)

(73) Assignee: Formlabs Inc., Somerville, MA (US)

( * ) Notice: Subject to any disclaimer, the term of this patent is extended or adjusted under 35 U.S.C. 154(b) by 80 days.

(21) Appl. No.: 18/049,432

(22) Filed: Oct. 25, 2022

(65) Prior Publication Data

US 2023/0138135 A1 May 4, 2023

Related U.S. Application Data

(60) Provisional application No. 63/263,042, filed on Oct. 26, 2021.

(51) Int. Cl.
*B29C 64/124* (2017.01)
*B29C 64/291* (2017.01)
*B33Y 10/00* (2015.01)
*B33Y 30/00* (2015.01)

(52) U.S. Cl.
CPC .......... *B29C 64/291* (2017.08); *B29C 64/124* (2017.08); *B33Y 10/00* (2014.12); *B33Y 30/00* (2014.12)

(58) Field of Classification Search
CPC ... B29C 64/124; B29C 64/129; B29C 64/236; B29C 64/264; B29C 64/277; B29C 64/286; B29C 64/291; B33Y 10/00; B33Y 30/00; B41J 3/28
See application file for complete search history.

(56) References Cited

U.S. PATENT DOCUMENTS

| | | | | |
|---|---|---|---|---|
| 4,739,415 | A | * 4/1988 | Toyono | B41J 3/28 347/3 |
| 2003/0214571 | A1 | * 11/2003 | Ishikawa | G02B 26/0841 347/255 |
| 2005/0248062 | A1 | * 11/2005 | Shkolnik | B33Y 50/02 264/401 |
| 2011/0009992 | A1 | * 1/2011 | Shkolnik | B33Y 50/02 358/1.3 |
| 2018/0085994 | A1 | * 3/2018 | FrantzDale | G03F 7/26 |
| 2019/0129309 | A1 | * 5/2019 | Hung | G02B 26/108 |
| 2020/0292415 | A1 | * 9/2020 | Goldman | B29C 64/268 |
| 2023/0119050 | A1 | * 4/2023 | Medalsy | B33Y 50/02 264/308 |

* cited by examiner

*Primary Examiner* — Galen H Hauth
*Assistant Examiner* — Baileigh Kate Darnell
(74) *Attorney, Agent, or Firm* — Honigman LLP

(57) ABSTRACT

A curing system includes a basin configured to receive a photopolymer resin, an ultraviolet light source, and a translating device. The ultraviolet light source is configured to selectively emit ultraviolet light. The ultraviolet light defines a pixelated array that illuminates at least a portion of the photopolymer resin. The pixelated array includes a first array axis and a second array axis oriented perpendicular to the first array axis. The translating device is configured to translate the pixelated array along a translation axis at an oblique angle relative to the first array axis.

20 Claims, 22 Drawing Sheets

SCANNED DLP WITH PIXEL DRIFT

CROSS REFERENCE TO RELATED APPLICATIONS

This application claims priority under 35 U.S.C. § 119(e) to U.S. Provisional Application 62/263,042, filed on Oct. 26, 2021. The disclosure of this prior application is considered part of the disclosure of this application and is hereby incorporated by reference in its entirety.

TECHNICAL FIELD

This disclosure generally relates to an additive fabrication system that uses a digital light processing (DLP) projector, and more particularly relates to an additive fabrication system that uses a scanned DLP projector with pixel drift.

BACKGROUND

Additive fabrication, e.g., three-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a build surface upon which the object is built.

In one approach to additive fabrication, known as stereolithography, solid objects are created by successively forming thin layers of a curable polymer resin, typically first onto a build surface and then one on top of another. Exposure to actinic radiation cures a thin layer of liquid resin, which causes it to harden and adhere to previously cured layers on the bottom surface of the build surface.

SUMMARY

An aspect of the disclosure provides a curing system for an additive fabrication system. The curing system includes a basin configured to receive a photopolymer resin, an ultraviolet light source, and a translating device. The ultraviolet light source is configured to selectively emit ultraviolet light. The ultraviolet light defines a pixelated array that illuminates at least a portion of the photopolymer resin. The pixelated array includes a first array axis and a second array axis oriented perpendicular to the first array axis. The translating device is configured to translate the pixelated array along a translation axis at an oblique angle relative to the first array axis.

Aspects of the disclosure may include one or more of the following optional features. In some implementations the ultraviolet light source includes a digital light processing (DLP) projector. In some implementations the ultraviolet light source includes a liquid crystal display (LCD). The ultraviolet light source may include a light-emitting diode (LED) array. The ultraviolet light source may include an organic light-emitting diode (OLED) array. The ultraviolet light source may include a micro-LED array. In some examples, a reflector device reflects the ultraviolet light emitted from the ultraviolet light source at the photopolymer resin. In those examples, the reflector device is configured to establish the pixelated array. In further examples, the reflector device includes a digital micromirror device (DMD). In some implementations, the pixelated array represents at least a portion of a build layer of a fabricated component.

In some embodiments, the translating device is configured to translate the pixelated array along the translation axis between a first position and a second position spaced from the first position. In further embodiments, the pixelated array is in a first configuration at the first position and the pixelated array is in a second configuration different from the first configuration at the second position. In even further embodiments, as the translating device translates the pixelated array between the first position and the second position, the ultraviolet light source does not emit ultraviolet light. In other even further embodiments, as the translating device translates the pixelated array between the first position and the second position, the ultraviolet light source emits ultraviolet light. In additional even further embodiments, as the translating device translates the pixelated array between the first position and the second position, the pixelated array transforms between the first configuration and the second configuration. In further embodiments, the translating device translates the pixelated array at a rate configured to allow at least a portion of the photopolymer resin illuminated by the pixelated array to cure.

Another aspect of the disclosure provides an additive fabrication system. The additive fabrication system includes a dispensing system, a base supporting a basin, a build platform, and a curing system. The basin is configured to receive a photopolymer resin from the dispensing system. The build platform is operable to traverse a vertical direction between an initial position adjacent to a bottom surface of the basin and a finished position spaced apart from the bottom surface of the basin. The curing system is housed within the base and configured to transmit actinic radiation into the basin to incrementally cure layers of the photopolymer resin onto the build platform to fabricate a component. The curing system includes an ultraviolet light source and a translating device. The ultraviolet light source is configured to selectively emit ultraviolet light. The ultraviolet light defines a pixelated array that illuminates at least a portion of the photopolymer resin. The pixelated array includes a first array axis and a second array axis oriented perpendicular to the first array axis. The translating device is configured to translate the pixelated array along a translation axis at an oblique angle relative to the first array axis.

This aspect of the disclosure may include one or more of the following optional features. In some examples, the ultraviolet light source includes a digital light processing (DLP) projector. In some further examples, the ultraviolet light source includes a liquid crystal display (LCD). The ultraviolet light source may include a light-emitting diode (LED) array. The ultraviolet light source may include an organic light-emitting diode (OLED) array. The ultraviolet light source may include a micro-LED array. In some embodiments, a reflector device reflects the ultraviolet light emitted from the ultraviolet light source at the photopolymer resin. In those embodiments, the reflector device is configured to establish the pixelated array. In further embodiments, the reflector device includes a digital micromirror device (DMD). In some implementations, the pixelated array represents at least a portion of a build layer of a fabricated component.

In some embodiments, the translating device is configured to translate the pixelated array along the translation axis between a first position and a second position spaced from the first position. In further embodiments, the pixelated array is in a first configuration at the first position and the pixelated array is in a second configuration different from the first configuration at the second position. In even further embodiments, as the translating device translates the pixelated array between the first position and the second position, the ultraviolet light source does not emit ultraviolet light. In other even further embodiments, as the translating device translates the pixelated array between the first position and the second position, the ultraviolet light source emits ultraviolet light. In additional even further embodiments, as the translating device translates the pixelated array between the first position and the second position, the pixelated array transforms between the first configuration and the second configuration. In further embodiments, the translating device translates the pixelated array at a rate configured to allow at least a portion of the photopolymer resin illuminated by the pixelated array to cure.

Another aspect of the disclosure provides a method for curing a photopolymer resin using a curing system that includes an ultraviolet light source. The method includes providing a curing system. The curing system includes a basin containing a photopolymer resin, an ultraviolet light source configured to emit ultraviolet light, and a translating device. The method further includes emitting ultraviolet light from the ultraviolet light source to cure at least a first portion of the photopolymer resin. The ultraviolet light defines a pixelated array that includes a first array axis and a second array axis oriented perpendicular to the first array axis. The method further includes translating, via the translating device, the pixelated array along a translation axis at an oblique angle relative to the first array axis to cure at least a second portion of the photopolymer resin different from the first portion.

This aspect of the disclosure may include one or more of the following optional features. In some examples the ultraviolet light source includes a digital light processing (DLP) projector. In some further examples, the ultraviolet light source includes a liquid crystal display (LCD). The ultraviolet light source may include a light-emitting diode (LED) array. The ultraviolet light source may include an organic light-emitting diode (OLED) array. The ultraviolet light source may include a micro-LED array. In some implementations, emitting the ultraviolet light includes reflecting the ultraviolet light emitted from the ultraviolet light source at the photopolymer resin by a reflector device configured to establish the pixelated array. In further implementations, the reflector device includes a digital micromirror device (DMD). In some embodiments, the pixelated array represents at least a portion of a build layer of a fabricated component.

In some examples, translating the pixelated array along the translation axis includes translating the pixelated array between a first position and a second position spaced from the first position. In further examples, the pixelated array is in a first configuration at the first position and the pixelated array is in a second configuration different from the first configuration at the second position. In even further examples, as the translating device translates the pixelated array between the first position and the second position, the ultraviolet light source does not emit ultraviolet light. In other even further examples, as the translating device translates the pixelated array between the first position and the second position, the ultraviolet light source emits ultraviolet light. In additional other even further examples, as the translating device translates the pixelated array between the first position and the second position, the pixelated array transforms between the first configuration and the second configuration. In further examples, translating the pixelated array includes translating the pixelated array at a rate configured to allow at least a portion of the photopolymer resin illuminated by the pixelated array to cure.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure relates to a curing system for an additive fabrication device (i.e., a three-dimensional (3D) printer) that incorporates a digital light processing (DLP) projector configured to emit light to transform a liquid photopolymer resin into a solid layer of a fabricated component. As will be discussed below, DLP projectors emit light at a wavelength configured to cure the liquid photopolymer resin and emit such light in a pixelated array corresponding to at least a portion the layer of the fabricated component. Because the DLP projectors emit light in a pixelated array, the resolution of the fabricated components are subject to the tolerance constraints of the pixelated array and thus may suffer from voxelization. In other words, surfaces of fabricated components formed using a traditional additive fabrication device having a DLP projector that are intended to be smooth, curved surfaces may instead be stepped surfaces (i.e., a series of small, square faces offset from one another). Improvements in resolution for a conventional system utilizing a DLP projector may achieve improvements in resolution of the fabricated component by moving the pixelated array along X and Y axes while curing a given layer of the resin. Unlike conventional additive fabrication systems, the curing system of the present disclosure achieves improvements in resolution of a fabricated component by moving a pixelated array of light projected from a DLP projector along a single axis while curing a given layer of liquid photopolymer resin. Thus, the present disclosure provides a curing system for an additive fabrication device that provides for enhanced resolution of fabricated components formed thereby and, because the curing system achieves the enhanced resolution with movement along only a single axis of a pixelated array formed from light emitted by a DLP projector, the curing system of the present disclosure provides for an additive fabrication device with simpler mechanical and software needs.

Figure 1A:
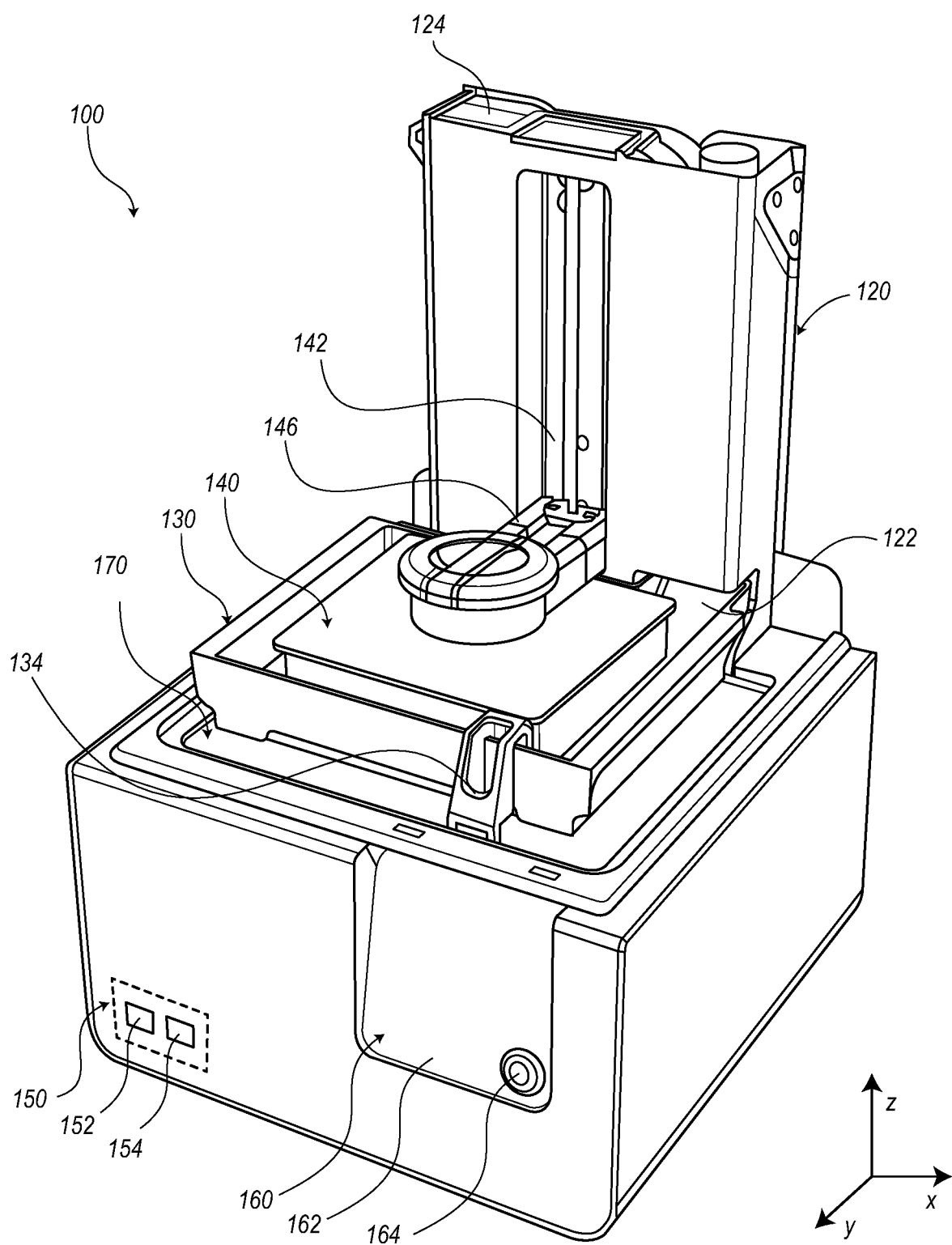
FIG. 1A shows a perspective view of an example additive fabrication system, where the system is arranged in an initial configuration.
Figure 1B:
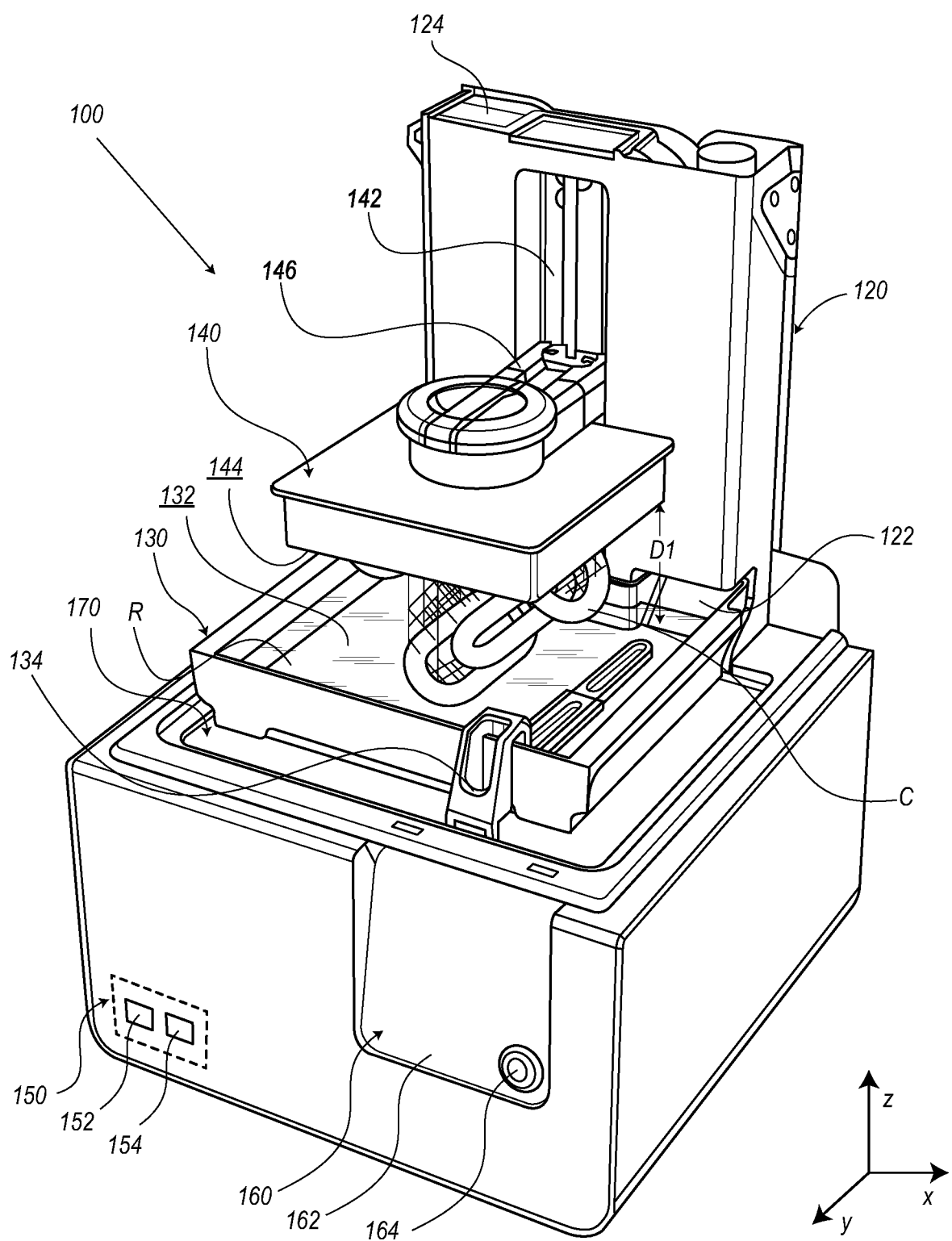
FIG. 1B shows a perspective view of an example additive fabrication system, where the system is arranged in a fabricating configuration.
Figure 1C:
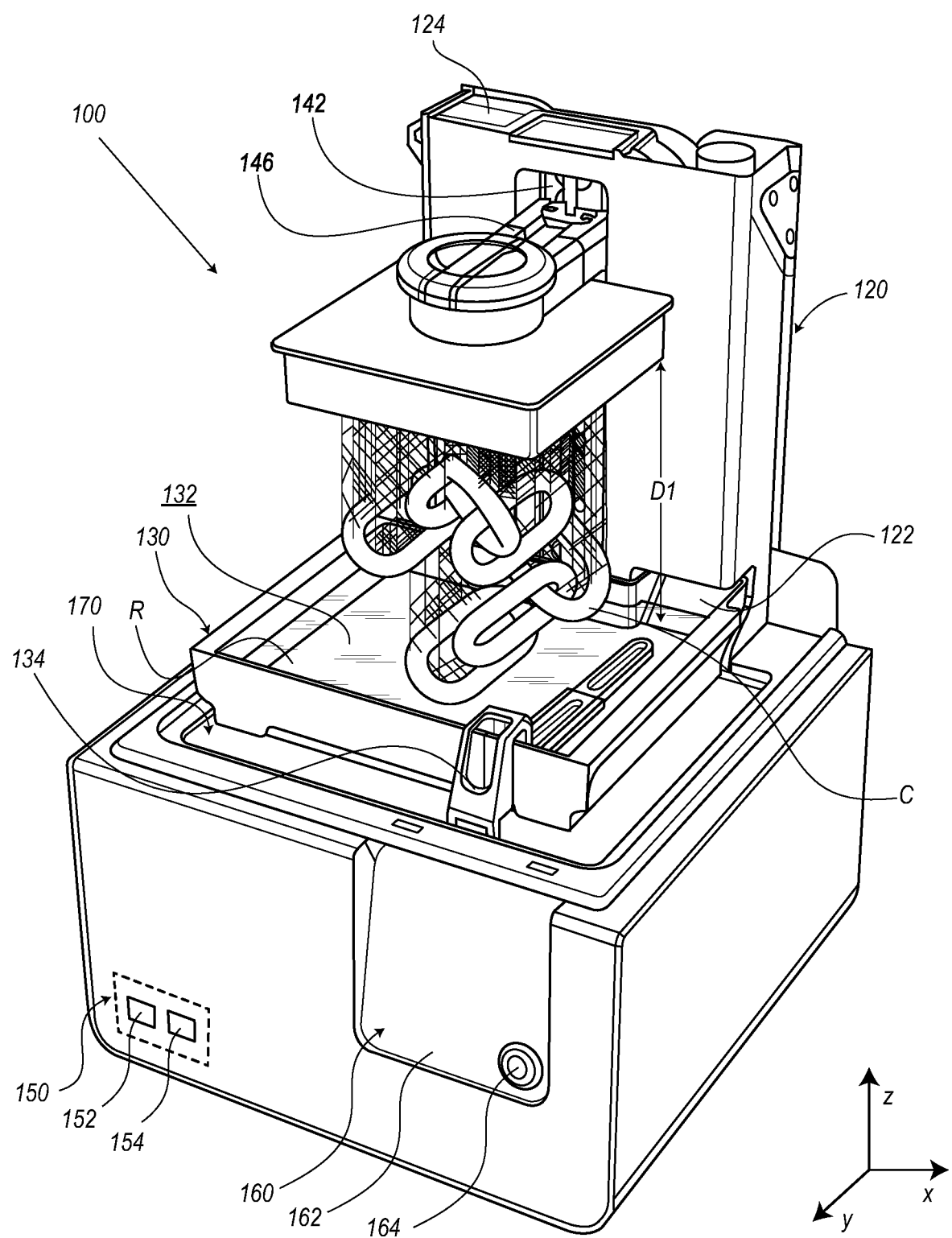
FIG. 1C shows a perspective view of an example additive fabrication system, where the system is arranged in a finished configuration.
Figure 2:
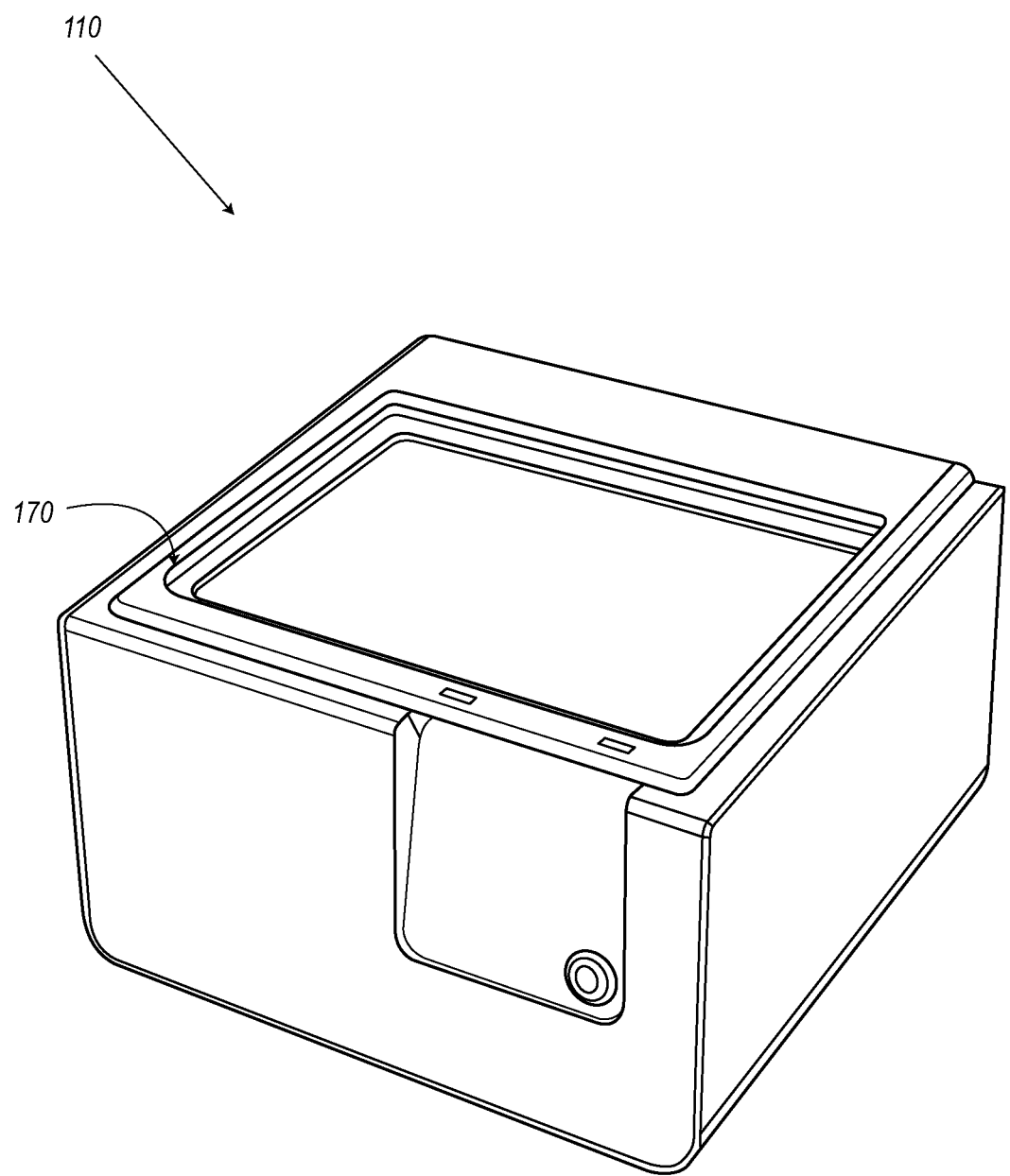
FIG. 2 shows a perspective view of an example of the additive fabrication system of FIG. 1A.

Referring to FIGS. 1A-1C, an additive fabrication device 100, such as a stereolithographic printer, includes a base 110 and a dispensing system 120 coupled to the base 110. The base 110 supports a fluid basin 130 configured to receive a photopolymer resin R (FIG. 3) from the dispensing system 120. The printer 100 further includes a build platform 140 positioned above the fluid basin 130 and operable to traverse a vertical axis (e.g., z-axis) between an initial position (FIG. 1A) adjacent to a bottom surface 132 of the fluid basin 130 and a finished position (FIG. 1C) spaced apart from the bottom surface 132 of the fluid basin 130.

The base 110 of the printer 100 may house various mechanical, optical, electrical, and electronic components operable to fabricate objects using the device. In the illustrated example, the base 110 includes a computing system 150 including data processing hardware 152 and memory hardware 154. The data processing hardware 152 is configured to execute instructions stored in the memory hardware 154 to perform computing tasks related to activities (e.g., movement and/or printing based activities) for the printer 100. Generally speaking, the computing system 150 refers to one or more locations of data processing hardware 152 and/or memory hardware 154. For example, the computing system 150 may be located locally on the printer 100 or as part of a remote system (e.g., a remote computer/server or a cloud-based environment).

The base 110 may further include a control panel 160 connected to the computing system 150. The control panel 160 includes a display 162 configured to display operational information associated with the printer 100 and may further include an input device 164, such as a keypad or selection button, for receiving commands from a user. In some examples, the display is a touch-sensitive display providing a graphical user interface configured to receive the user commands from the user in addition to, or in lieu of, the input device 164.

The base 110 houses a curing system 170 configured to transmit actinic radiation into the resin basin 130 to incrementally cure layers of the photopolymer resin contained within the basin 130. The curing system 170 may include a projector or other radiation source configure to emit light at a wavelength suitable to cure the photopolymer resin R within the basin. Thus, different light sources may be selected depending on the desired photopolymer resin R to be used for fabricating a component C. In the present disclosure, the curing system 170 includes a DLP projector for curing the photopolymer resin within the basin 130.

As shown, the basin 130 is disposed atop the base 110 adjacent to the curing system 170 and is configured to receive a supply of the resin R from the dispensing system 120. The dispensing system 120 may include an internal reservoir 124 providing an enclosed space for storing the resin until the resin is needed in the basin 130. The dispensing system 120 further include a dispensing nozzle 122 in communication with the basin 130 to selectively supply the resin R from the internal reservoir 124 to the basin 130.

The build platform 140 may be movable along a vertical track or rail 142 (oriented along the z-axis direction, as shown in FIGS. 1A-1C) such that base-facing build surface 144 of the build platform 140 is positionable at a target distance D1 along the z-axis from a bottom surface 132 of the basin 130. The target distance D1 may be selected based on a desired thickness of a layer of solid material to be produced on the build surface 144 of the build platform 140 or onto a previously formed layer of the object being fabricated. In some implementations, the build platform 140 is removable from the printer 100. For instance, the build platform 140 may be attached to the rail 142 by an arm 146 (e.g., pressure fit or fastened onto) and may be selectively removed from the printer 100 so that a fabricated component C attached to the build surface 144 can be removed.

In the example of FIGS. 1A-1C, the bottom surface 132 of the basin 130 may be light-transmissible (e.g., transparent, translucent) to actinic radiation that is generated by the curing system 170 located within the base 110, such that liquid photopolymer resin located between the bottom surface 132 of the basin 130 and the build surface 144 of the build platform 140 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the build surface 144 of the build platform 140 or to a bottom surface of an object being fabricated thereon.

Following the curing of a layer of the fabrication material, the build platform 140 may incrementally advance upward along the rail 142 in order to reposition the build platform 140 for the formation of a new layer and/or to impose separation forces upon any bond with the bottom surface 132 of basin 130. In addition, the basin 130 is mounted onto the support base such that the printer 100 may move the basin 130 along a horizontal axis of motion (e.g., x-axis), the motion thereby advantageously introducing additional separation forces in at least some cases. A wiper 134 is additionally provided, capable of motion along the horizontal axis of motion and which may be removably or otherwise mounted onto the base 110 or the fluid basin 130.

With continued reference to FIGS. 1A-1C, the printer 100 is shown at different stages of the fabrication process. For example, at FIG. 1A, the printer is shown in an initial state prior to dispensing the resin R into the basin 130 from the reservoir 124 of the dispensing system 120. Upon receipt of fabrication instructions, the printer 100 positions the build surface 144 of the build platform 140 at an initial distance D1 from the bottom surface 132 of the basin 130 corresponding to a thickness of the first layer of resin R to be cured. The curing system 170 then emits an actinic radiation profile (i.e., an image) corresponding to the profile of the current layer of the component C to cure the current layer. Upon curing of the current layer, the build platform 140 incrementally advances upward to the next build position. The distance of each advancement increment corresponds to a thickness of the next layer to be fabricated. The curing system 170 then projects the profile of the component layer corresponding to the new position. The new component layer is cured on a bottom surface of the previous component layer. The curing and advancing steps repeat until the build platform 140 reaches the final position (FIG. 1C) corresponding to the finished component C.

Figure 3:
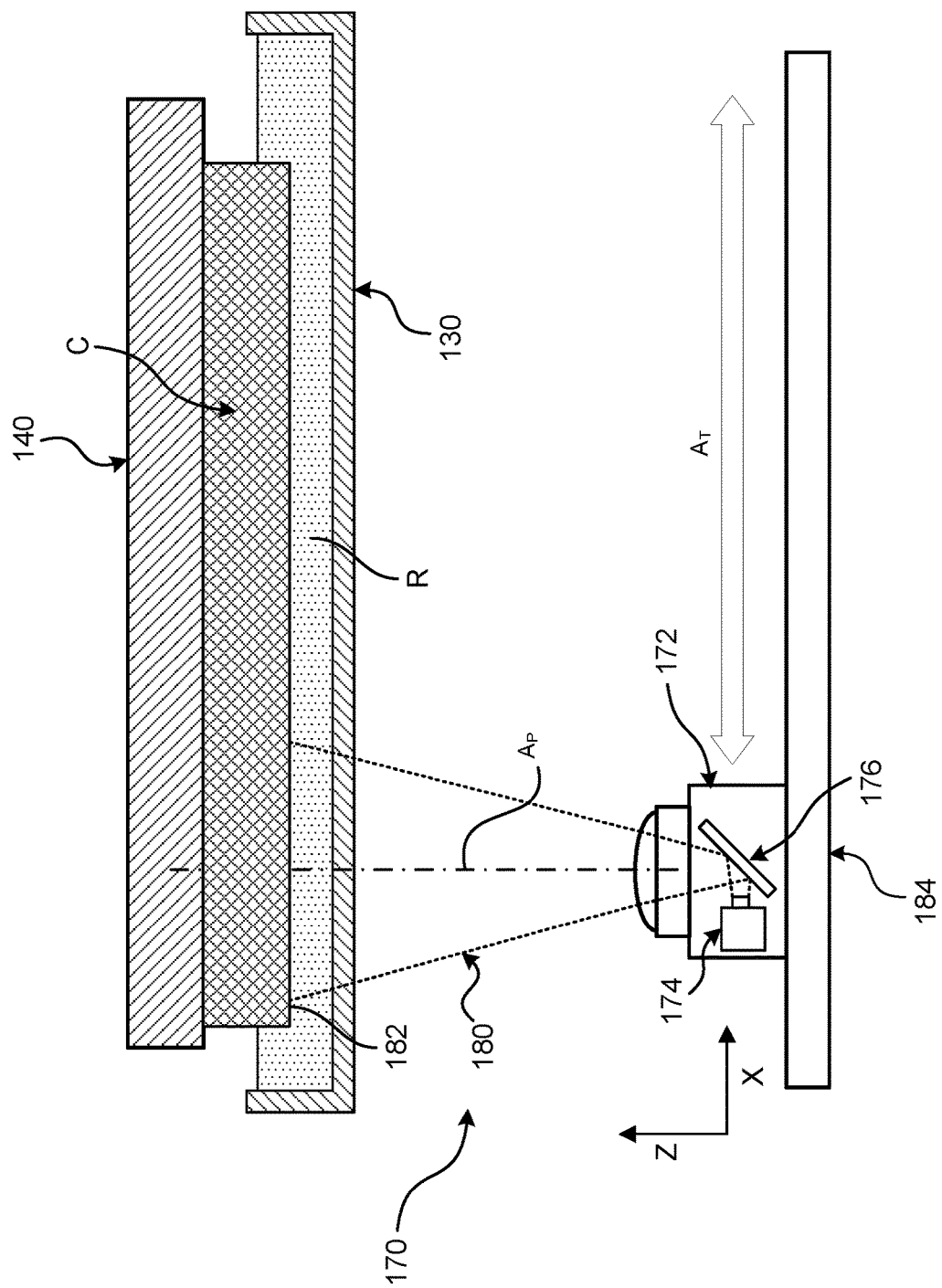
FIG. 3 shows a plan view of a curing system projecting light onto a curing plane.

Referring now to FIG. 3, the curing system 170 includes a light source 172 that emits the actinic radiation profile or ultraviolet light as a pixelated array 180 of light corresponding to at least a portion of a layer of the component C. The light source 172 may include any suitable light source configured to emit the pixelated array 180. For example, the light source 172 may include one or more, such as an array including, a light-emitting diode (LED), an organic light-emitting diode (OLED), a micro-LED, a liquid crystal display (LCD), or any other suitable light emitting device. In the illustrated embodiment, the light source 172 includes the DLP projector 174 that emits light at a wavelength suitable to cure the liquid photopolymer resin. The DLP projector 174 may include the one or more LEDs, OLEDs, micro-LEDs, or the LCD. Light emitted by the DLP projector 174 may shine directly on the target area 182 (the build platform or the previously cured layer of the component) to cure the resin or the light may be reflected onto the target area 182 via a digital micromirror device (DMD) 176, where the DMD 176 is responsible for transforming the light emitted by the DLP projector 174 into the pixelated array 180. The DMD 176 includes a series of light reflecting and light absorbing components arranged in a matrix on a semiconductor chip. For example, the DMD 176 may include a series of mirrors and heat sinks. Selectively toggling a portion of the semiconductor to expose individual ones of the mirrors and heat sinks results in the reflection of the desired pixelated array 180. It should be understood that the light source 172 of the curing system 170 may emit a plurality of pixelated arrays, such as from a plurality of DLP projectors and/or DMDs, but for the sake of clarity in providing the present disclosure, unless otherwise noted, the illustrated embodiment cures layers of the finished component C via a single pixelated array 180.

Figure 4B:
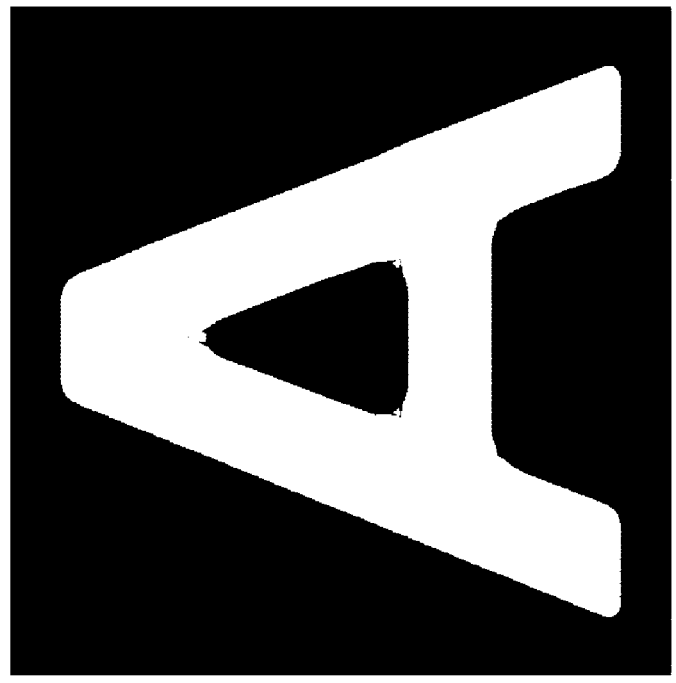
FIGS. 4A and 4B show images generated using the same size pixels, where FIG. 4A was generated without pixel drift and FIG. 4B was generated with pixel drift.
Figure 4A:
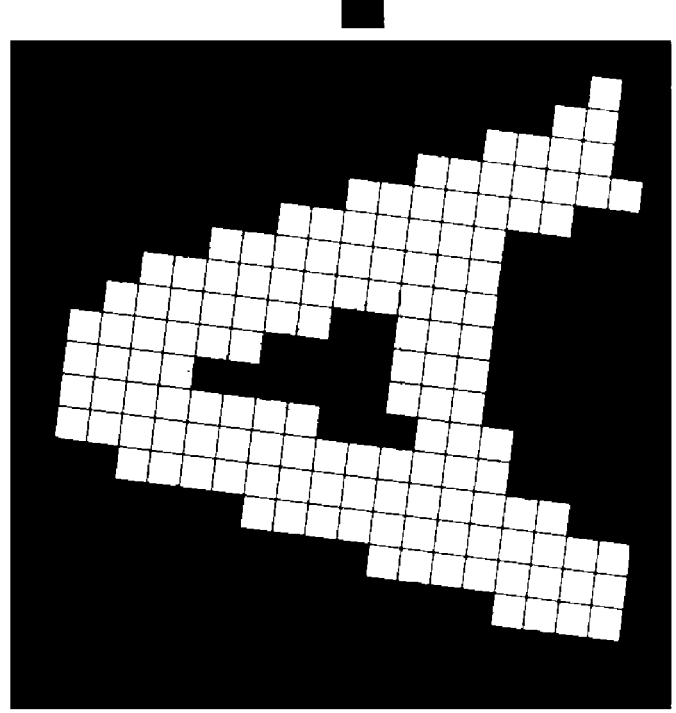

As described above, curing a layer of the finished component C involves emitting light through the liquid photopolymer resin R onto the target area 182. Emitting the light in the form of the pixelated array 180 allows the curing system 170 to emit uniform light across and cure a larger portion (and in some instances, the entirety) of a layer of the finished component C at a given time. This results in faster and more uniform curing of the finished component C. However, and as also described above, curing the resin via the pixelated array 180 may also result in voxelization or other losses in resolution of the finished component C. Because the pixelated array 180 is an array or matrix of individual pixels 181a, the edges of a layer cured via the pixelated array 180 are dictated by the locations of activated pixels (i.e., pixels where light is reflected or transmitted from the DLP projector 174) and deactivated pixels (i.e., pixels where light is not reflected or transmitted from the DLP projector 174). Thus, the resolution of a system that cures a layer of resin via a stationary pixelated array are defined by the length and width of individual pixels. For example, as shown in FIG. 4A, an image generated by a conventional pixelated array has comparably lower resolution than an image generated by a pixelated array according to the present disclosure (FIG. 4B). Both images were generated using a pixelated array having the same size pixels.

In reference to FIG. 3, to improve the resolution provided by the DLP projector 174 (i.e., improve the tolerance capabilities of the curing system 170), curing a layer of the finished component C may further include translating the pixelated array 180 along a translation axis $A_T$. The translation axis $A_T$ is depicted as the X axis in FIG. 3, with a projection axis $A_P$ depicted as the Z axis. The projection axis $A_P$ is defined by the direction in which the pixelated array 180 is reflected or transmitted to the target area 182. The pixelated array 180 may be directed at the target area 182 directly from the DLP projector 174 or the pixelated array 180 may be directed at the cure plane via the DMD 176 or any suitable light source. In other words, the DLP projector 174 may project the pixelated array 180 onto the target area 182 directly or the pixelated array 180 may be reflected onto the target area 182 from the DMD 176. Furthermore, the projection axis $A_P$ is depicted as normal to the target area 182, but may be at any suitable oblique angle relative to the target area 182. For example, the pixelated array 180 may be transmitted onto the target area 182 at an oblique angle relative to the target area 182 and the curing system 170 may correct for any image distortion of the pixelated array 180, such as via software correction of the image of the layer being cured or adjustment of the pixels 181a of the pixelated array 180. Thus, the curing system 170 may transmit the pixelated array 180 to the target area 182 in any suitable way that provides a high resolution image.

Translating the pixelated array 180 along the translation axis $A_T$ allows for the light source to cover a larger target area and therefore cure larger layers of the finished component C than a conventional stationary curing system. Translating the pixelated array 180 along the translation axis $A_T$ may also allow for the curing system 170 to improve the resolution of the finished component C along a single axis. In other words, moving the pixelated array 180 along the translation axis $A_T$ allows for a reduction in resolution of the curing system 170 along the translation axis $A_T$. For example, the curing system 170 may configured to translate the pixelated array 180 along the translation axis $A_T$ at a continuous rate or at increments that are less than the width of a pixel 181a of the pixelated array 180. Therefore, moving the pixelated array 180 along the translation axis $A_T$ by a distance that is a fraction of a pixel 181a allows the curing system 170 to establish edges of a layer of the finished component C in increments that are less than the width of the pixel 181a. In other words, the positions of pixels 181a as the pixelated array 180 is translated may overlap incrementally to provide for improved resolution.

A translating device or system 184 translates the pixelated array 180 relative to the target area 182. Optionally, the translating device 184 may translate the target area 182 relative to a stationary light source 172 to achieve the translation of the pixelated array 180 along the translation axis $A_T$. In the illustrated embodiment, the translating device 184 moves the light source 172 to translate the pixelated array 180 along the translation axis $A_T$. For example, the translating device 184 may translate the pixelated array 180 via movement of the DLP projector 174 emitting the light. In other embodiments, the pixelated array 180 may be translated along the translation axis $A_T$ via movement (e.g., rotation) of the DMD 176 reflecting the light from the DLP projector 174, a combination of movement of the DLP projector 174 and DMD 176, and/or some other type of mechanical movement of the curing system 170 that results in translation of the pixelated array 180 along the translation axis $A_T$. The translating device 184 may include any sort of device suitable for moving components of the curing system 170, such as a stepper motor.

Figure 5:
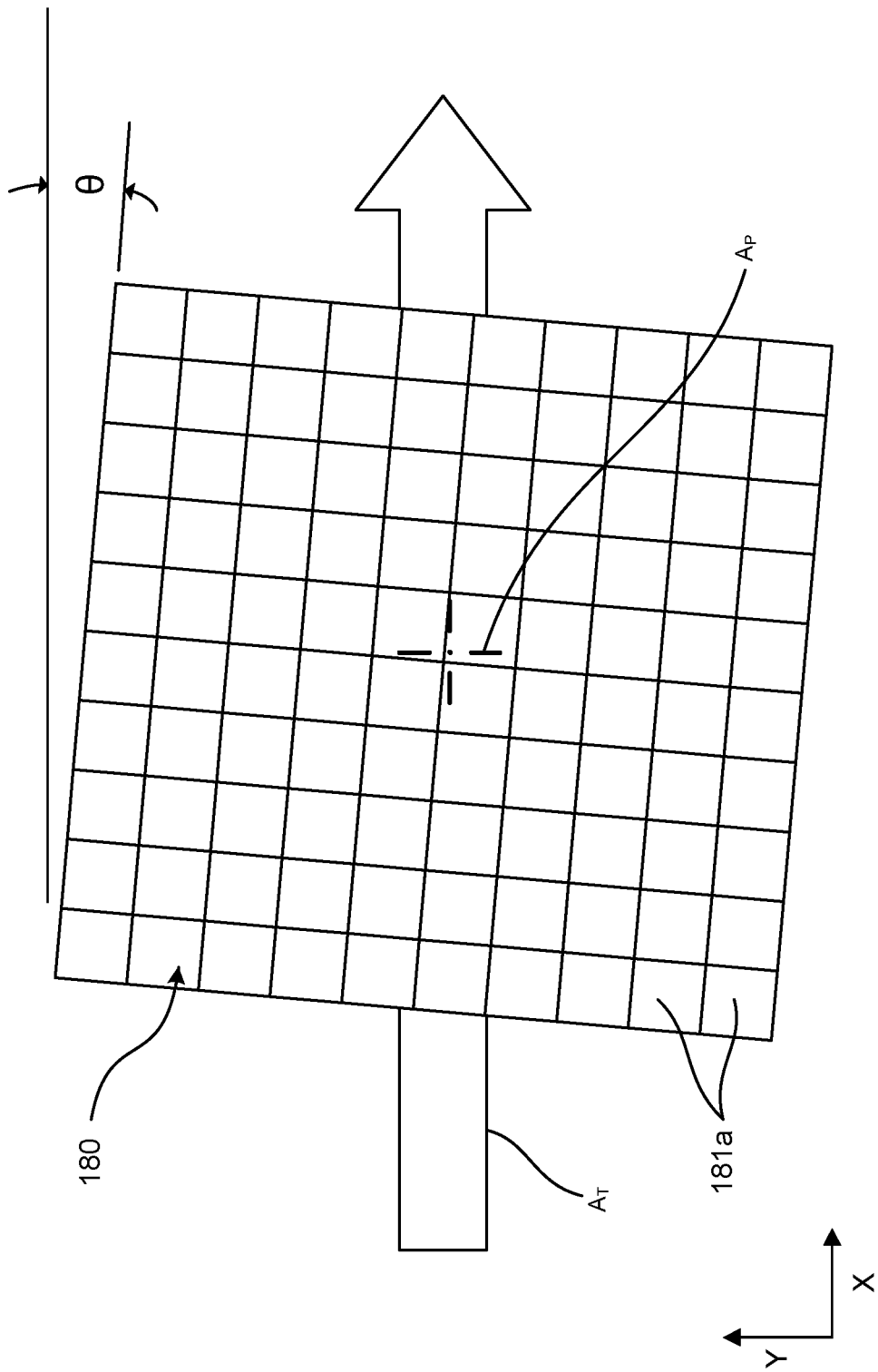
FIG. 5 shows a plan view of a pixelated array tilted relative to a translation axis of movement.

As shown in FIG. 5, the pixelated array 180 may be tilted relative to the translation axis $A_T$ (i.e., rotated slightly about the projection axis $A_P$) so that, when the pixelated array 180 is translated along the translation axis $A_T$, the translation of the pixelated array 180 improves the resolution of the curing system 170 along the translation axis $A_T$ and the tilt or rotation of the pixelated array 180 improves the resolution of the curing system 170 along a direction perpendicular to the translation axis $A_T$ (e.g., the Y axis). In other words, tilting or rotating the pixelated array 180 relative to the translation axis $A_T$ causes the pixels 181*a* to overlap incrementally across the translation axis $A_T$ (Y direction) as well as along the translation axis $A_T$ (X direction) when the pixelated array 180 is translated.

The pixelated array 180 is tilted relative to the translation axis $A_T$ by a translation angle $\theta$. For example, the pixelated array 180 may be tilted by a translation angle $\theta$ up to 45 degrees relative to the translation axis $A_T$. Thus, full sub-pixel resolution (where tolerances of the pixelated array are less than a dimension of a given pixel in both axes of direction) may be achieved while only translating the pixelated array in a single direction. As will be further described below, the sub-pixel resolution along the translation axis $A_T$ is dictated by the movement of the pixelated array 180 along the translation axis $A_T$ in sub-pixel increments. In other words, pixels 181*a* of the pixelated array 180 may be positioned at locations that overlap with previous pixel positions along the translation axis $A_T$ as the pixelated array 180 translates. Sub-pixel resolution across the translation axis $A_T$ is achieved by tilting the pixelated array 180 by the translation angle $\theta$, which results in incremental cross-axis progression in pixel alignment. In other words, pixels 181*a* of the pixelated array 180 may be positioned at locations that overlap with previous pixel positions across the translation axis $A_T$ as the pixelated array 180 translates.

Figure 6A:
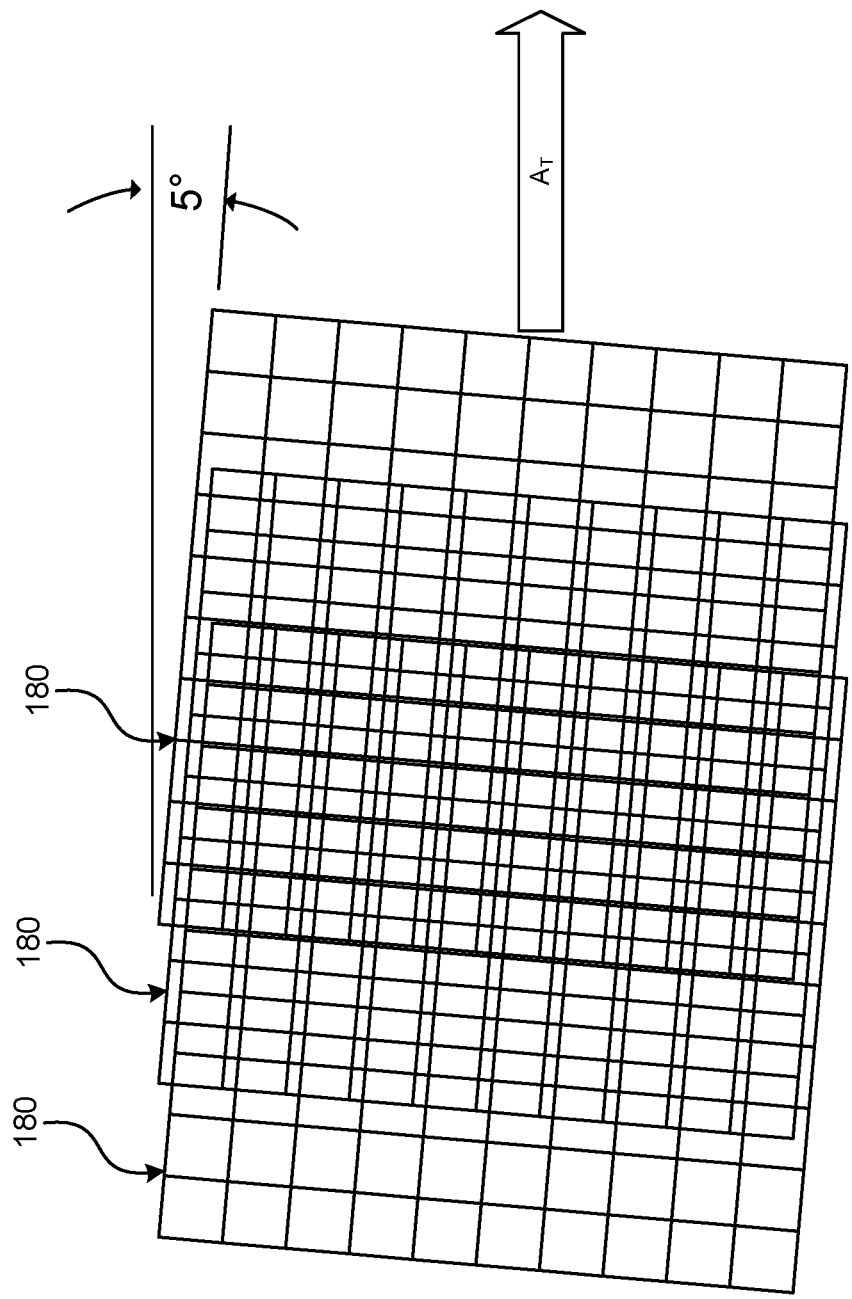
FIGS. 6A-6C show plan views of pixelated arrays translated along respective translation axes of movement, where the pixelated arrays each have square pixels and are tilted relative to the translation axis by a different angle.

FIG. 6A depicts a low tilt pixelated array 180 tilted relative to the translation axis $A_T$ by a translation angle $\theta$ of five degrees. As shown, the pixelated array 180 is translated along the translation axis $A_T$ in increments that are less than the width of a pixel 181*a* so that, with the pixelated array 180 positioned at or between the incremental positions, the individual pixels 181*a* may be selectively activated or deactivated to cure resin at a position corresponding to the position of the pixel 181*a*. Thus, the resolution of layers of a component cured via such a pixelated array 180 translated along the translation axis $A_T$ may correspond to the differences in position (i.e., the overlap) between pixels 181*a* when the pixelated array 180 is incrementally translated. Similarly, FIG. 6B depicts a medium tilt pixelated array 180 tilted relative to the translation axis $A_T$ by a translation angle $\theta$ of 15 degrees and FIG. 6C depicts a full tilt pixelated array 180 tilted relative to the translation axis $A_T$ by a translation angle $\theta$ of 45 degrees.

Figure 6B:
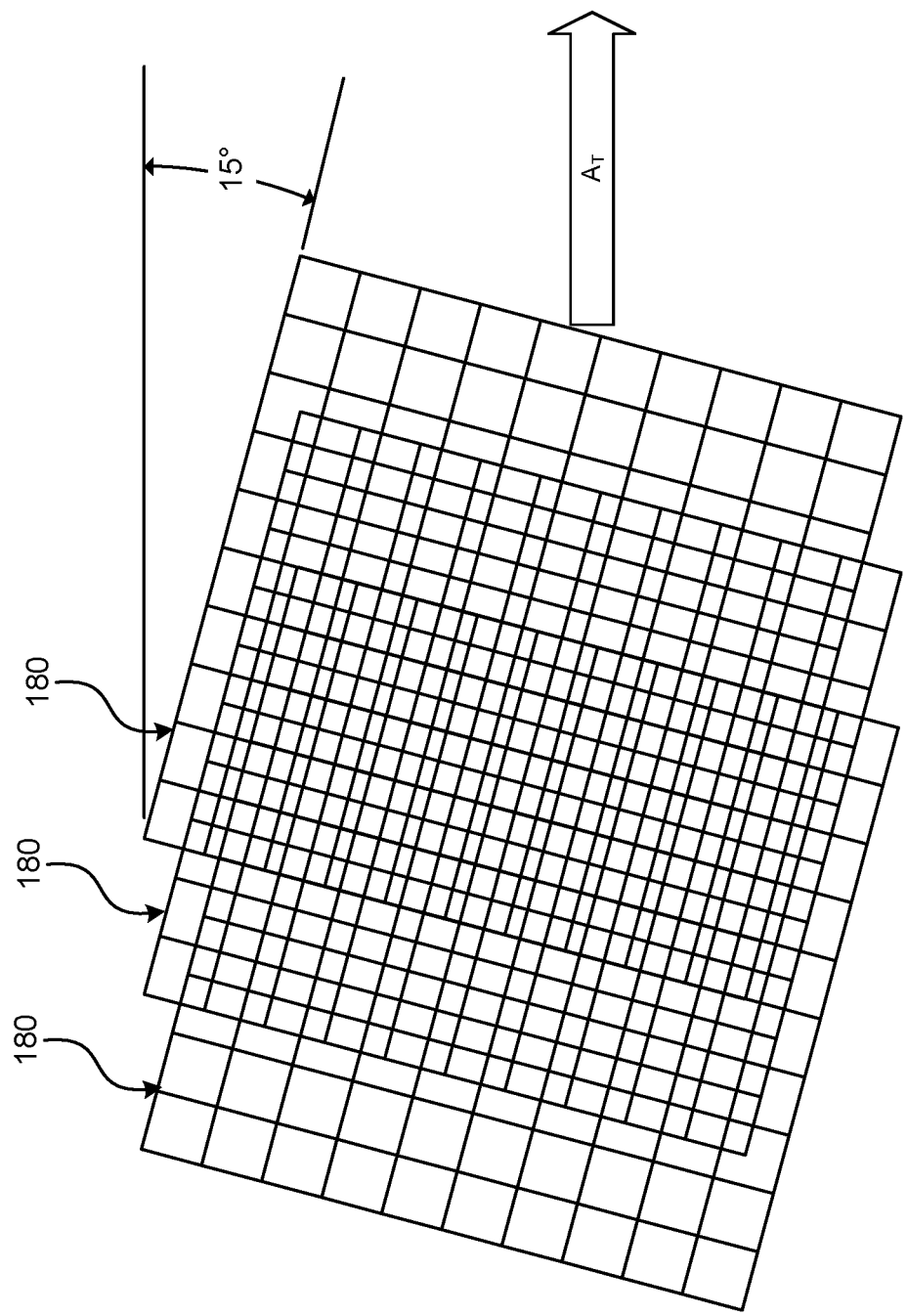
Figure 6C:
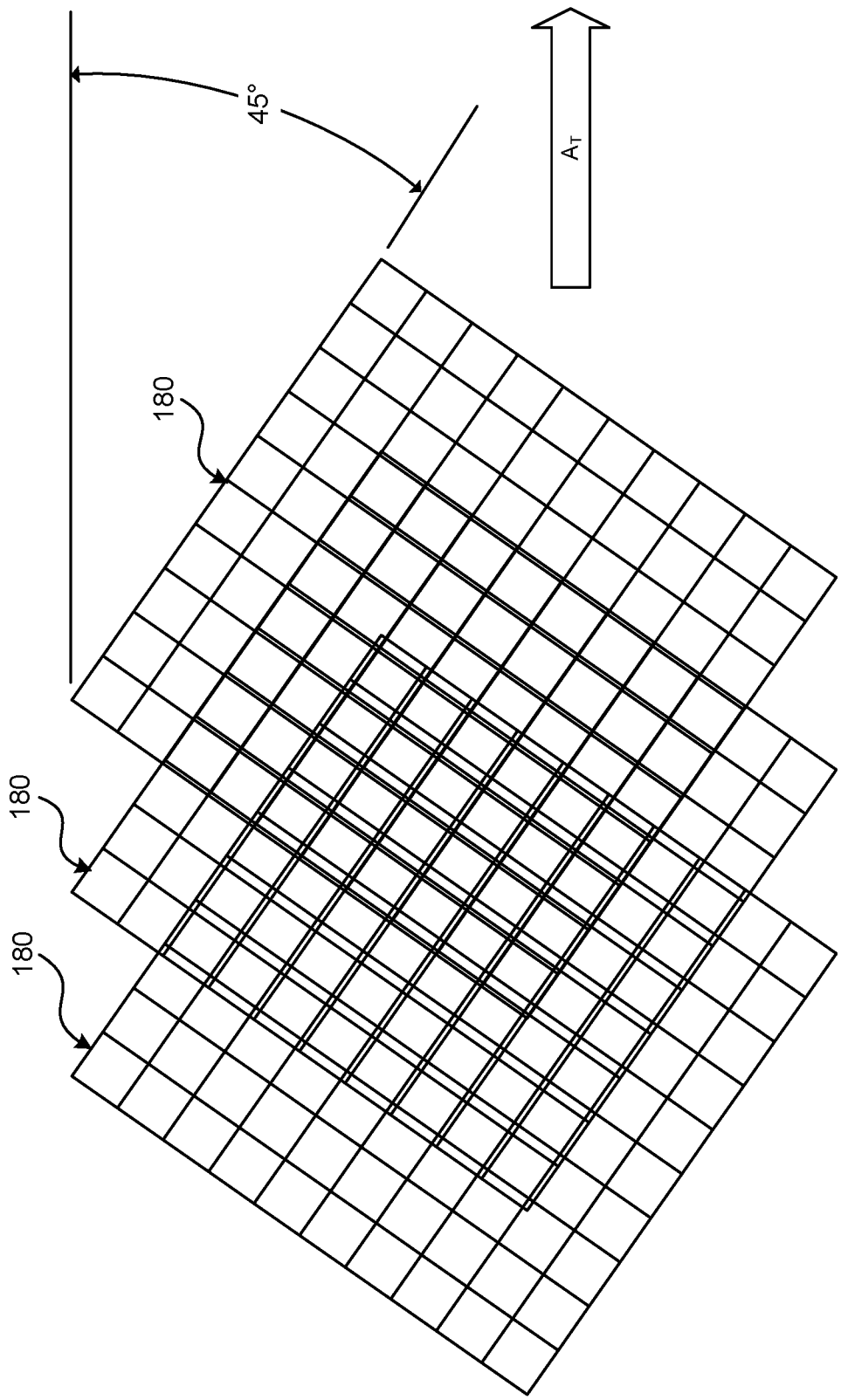
Figure 7A:
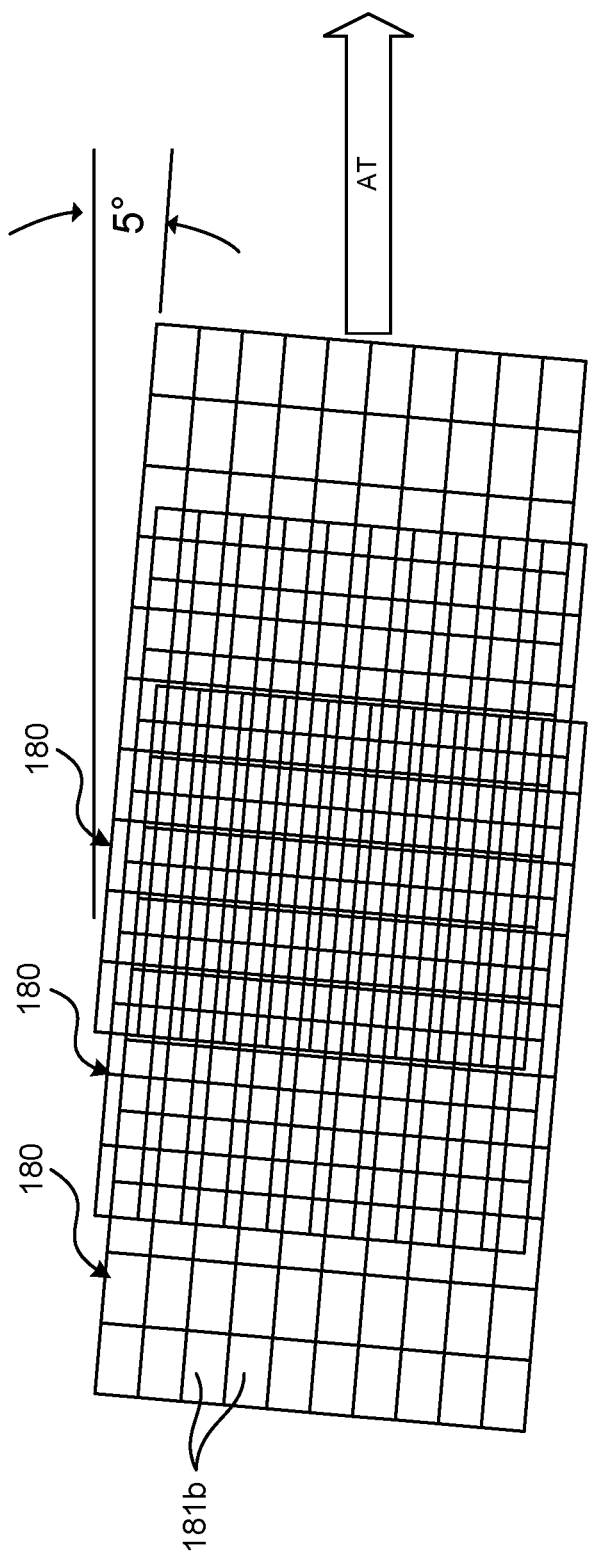
FIGS. 7A and 7B show plan views of pixelated arrays translated along respective translation axes of movement, where the pixelated arrays each have rectangular pixels and are tilted relative to the translation axis by a different angle.
Figure 7B:
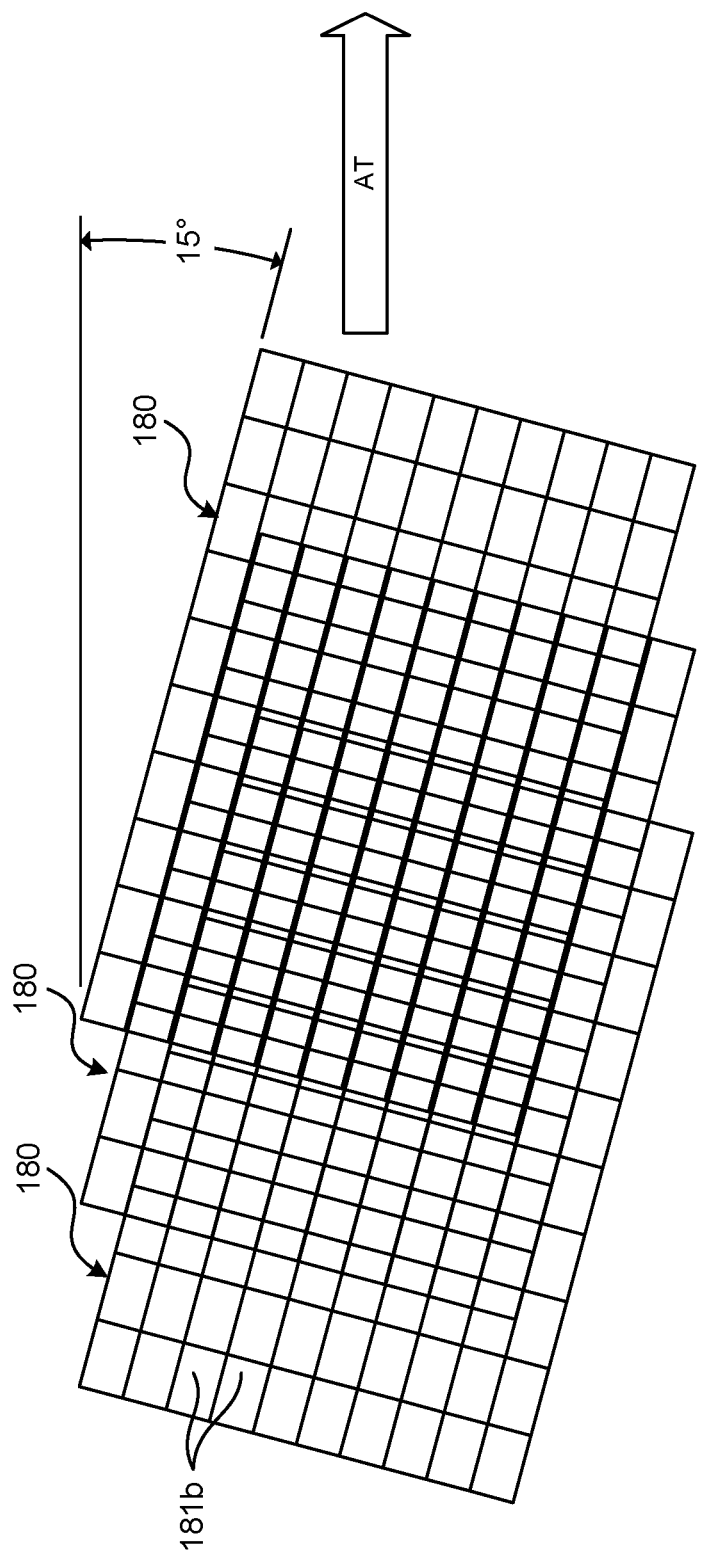

FIGS. 6A-6C depict pixelated arrays 180 with square pixels 181*a*. FIGS. 7A and 7B depict pixelated arrays 180 with rectangular pixels 181*b*, with FIG. 7A depicting a low tilt pixelated array 180 tilted relative to the translation axis AT by 5 degrees and FIG. 7B depicting a medium tilt pixelated array 180 tilted relative to the translation axis AT by 15 degrees. Elongation of the pixels 181*b* relative to the translation axis $A_T$ may provide for a more symmetrical overlap of the pixels 181*b* as the pixelated array 180 is translated.

Figure 8B:
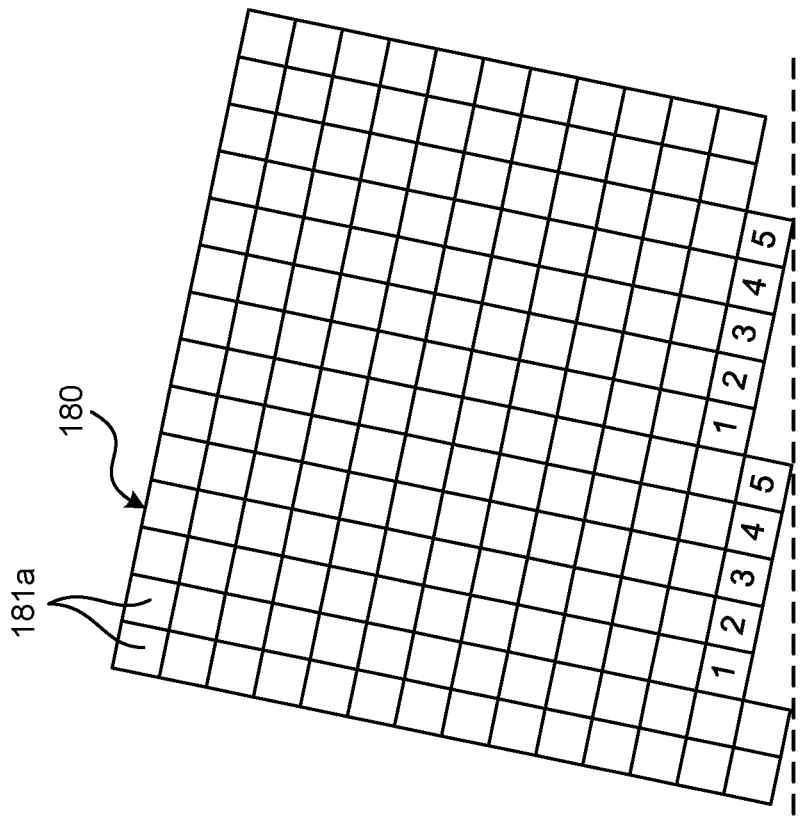
FIGS. 8A and 8B show plan views of pixelated arrays having different drift numbers.
Figure 8A:
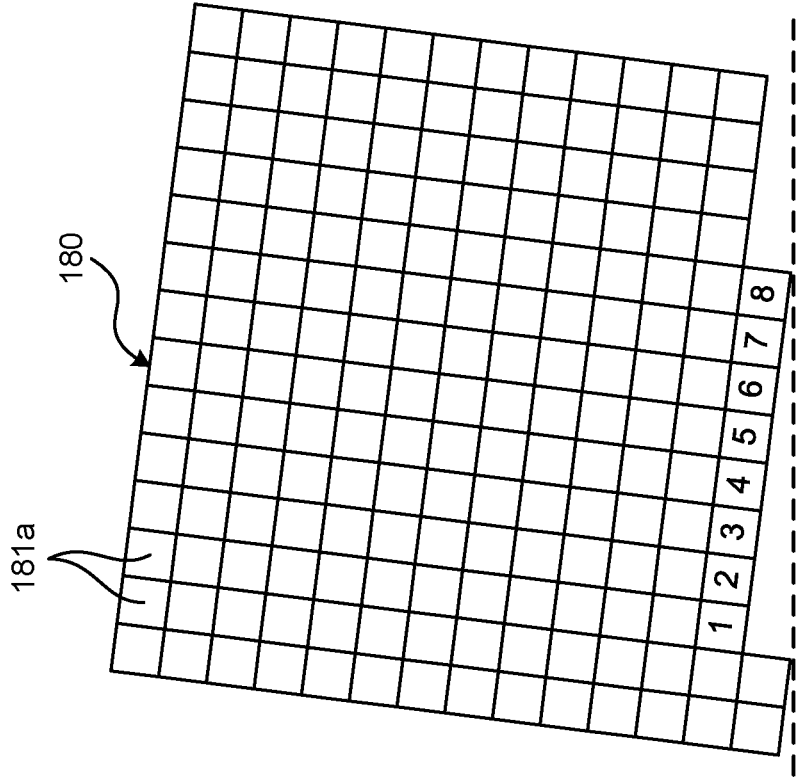

The translation angle $\theta$ and dimensions of the pixels of the pixelated array 180 provide a drift number N of the pixelated array 180. The drift number N is the number of pixels 181*a*, 181*b* approximately perpendicular to the translation axis $A_T$ over which a lateral translation of one pixel 181*a*, 181*b* occurs approximately perpendicular to the translation axis $A_T$. In other words, as the pixelated array 180 translates along the translation axis $A_T$, individual pixels 181*a* maintain a lateral position relative to the translation axis $A_T$, with lateral positions of the pixels 181*a* repeating incrementally in a pattern. The number of pixels 181*a* with different lateral positions between repeating lateral position is the drift number N. For example, FIG. 8A depicts a pixelated array 180 with a drift number N of eight and FIG. 8B depicts a pixelated array 180 with a drift number N of five. For square pixels 181*a*, the drift number N is equal to $1/\tan(\theta)$. Thus, the lower the translation angle $\theta$, the higher the drift number N of the pixelated array 180. A higher drift number N results in higher resolution across the translation axis $A_T$ because each pixel 181*a* moves laterally to a lower degree relative to its longitudinal translation. However, a higher drift number N also results in a longer drift cycle, which is the distance between repeating lateral positions of pixels 181*a* (i.e., the distance the pixelated array 180 must travel for lateral positions of pixels 181*a* to repeat). One drift cycle corresponds to a travel distance along the translation axis $A_T$ equal to pixel pitch/$\sin(\theta)$, where the pixel pitch is the distance between the center of each pixel 181*a* (i.e., a dimension of a square pixel).

The pixelated array 180 may be tilted relative to the translation axis $A_T$ in any suitable manner. For example, a component of the light source 172, such as the DLP projector 174 or the DMD 176 may be rotated so as to reflect a pixelated array 180 that is rotated relative to the translation axis $A_T$. Optionally, the image to be projected may be rotated by software so that the resulting pixelated array 180 is rotated relative to the intended image to be projected. The curing system 170 may be configured so that the pixelated array 180 is rotated a fixed amount (such as by having a DMD 176 that is permanently rotated relative to the translation axis AT) or the curing system 170 may be configured to rotate the pixelated array 180 according to a desired resolution of the finished component C, where the translation angle $\theta$ is adjustable, such as via a user input or constraint of the image to be projected. For example, the computing system 150 may be configured to receive a user input indicating a desired resolution and rotate the pixelated array 180 appropriately to achieve the desired resolution. The computing system 150 may also be configured to apply a non-uniform drift angle (i.e., rotate portions of the pixelated array 180 by different translation angles θ) such as to correct for image distortion.

If there is some error in the translation angle θ of the pixelated array 180 that will lead to an XY placement error between the start and end of a drift cycle. Here, the error will occur perpendicular to the translation axis $A_T$. The magnitude of placement error per drift cycle per degree of misalignment is greater for pixelated arrays with larger pixel pitch. It should be understood that a one degree rotational misalignment is large and that curing systems 170 according to the present disclosure may be properly rotated within a fraction of a degree. A multipoint calibration method or system may correct for rotational misalignment, such as via software in communication with the curing system 170, that may determine rotational misalignment, such as during a calibration process, responsive to user input, or based on sensed measurements of finished components C during the printing process.

As described above, translation of the pixelated array 180 along the translation axis $A_T$ and rotation of the pixelated array 180 relative to the translation axis $A_T$ (i.e., about the projection axis $A_P$) by a translation angle θ provides improvements in resolution of the cured layer of the finished component C in both X and Y axes. Translation of the pixelated array 180 may be enabled via the translation device or system 184 that causes movement of the DLP projector 174, movement of the DMD 176, coordinated movement of both the DLP projector 174 and DMD 176, movement of the target area 182, or translation of the pixelated array 180 in any other suitable fashion. Thus, the pixelated array 180 emitted by the curing system 170 onto the target area 182 at any given position along the translation axis AT represents a portion of the cured layer. As the liquid photopolymer resin R is exposed to the light emitted by the curing system 170, the resin R cures at positions corresponding to the activated pixels 181 of the pixelated array 180. To achieve the desired resolution of the cured layer, the pixels 181 are selectively activated or deactivated as the pixelated array 180 translates along the translation axis $A_T$ so that the resin at given positions of the target area 182 receive the requisite amount of light to cure. In other words, the pixelated array 180 is translated or scanned across the target area 182, such as at least between a first position and a second position along the translation axis $A_T$, and the pixelated array 180 is adjusted or updated at the individual pixel level responsive to or during the movement of the pixelated array 180.

The pixelated array 180 may be adjusted or updated according to a scanning method, where the scanning method controls how the pixels 181a are selectively activated or deactivated as the pixelated array 180 is translated along the translation axis $A_T$. For example, the pixelated array 180 may be translated along the translation axis $A_T$ between at least a first position and a second position, where the first position and the second position may be distanced relative to one another along the translation axis $A_T$ according to the layer of the finished component C being cured by the curing system 170. The distance between the first position and the second position is configured so that the pixelated array 180 at the first position overlaps the pixelated array 180 at the second position by at least a fraction of a pixel width. For example, the scanning method may result in a pixelated array 180 at the first position overlapping a pixelated array 180 at the second position by only a fraction of a pixel width or the second position may be only a fraction of a pixel width away from the first position.

As will be further discussed below, the scanning method may adjust a configuration of the pixelated array 180 at given intervals or increments of movement of the pixelated array 180 or the scanning method may adjust the configuration of the pixelated array 180 continuously as the pixelated array 180 is scanned along the translation axis $A_T$. A scanning method where the configuration of the pixelated array 180 is adjusted continuously as the pixelated array 180 is translated along the translation axis AT may be referred to as a scanned exposure scanning method. A scanning method where a first configuration of the pixelated array 180 is displayed at a first position and an adjusted second configuration of the pixelated array 180 is displayed at a second position a distance away from the first position, with no light emitted at the target area between the exposure at the first position and the exposure at the second position, may be referred to as a quasi-tile exposure scanning method.

During a scanned exposure scanning method, the target area 182 is exposed to light emitted by the DLP projector 174 continuously as the pixelated array 180 is translated along the translation axis $A_T$ between a start and an end position at a continuous velocity. As mentioned above, for a given portion of the liquid photopolymer resin R to cure (i.e., for a pixel 181a of the pixelated array 180 to cure a portion of the layer), the portion is exposed to light for at least a threshold amount of time. Therefore, the pixelated array 180 is held substantially stable or motionless at the start and end positions and the velocity is selected so that the pixelated array 180 exposes desired portions of the resin R for at least the threshold amount of time as the pixelated array 180 is translated. The pixelated array 180 is not adjusted between configurations when the pixelated array 180 is at the start and end positions. However, it should be understood that at the start and end positions, the pixelated array 180 is translated along the translation axis $A_T$ a threshold amount to provide the improved resolution at the start and end positions. Individual pixels 181a of the pixelated array 180 are adjusted at a rate according to the velocity and exposure time of portions of the layer being cured. Thus, during the scanned exposure scanning method, the pixelated array 180 is translated along the translation axis $A_T$ between a first position and a second position (where the first and second positions are respectively a start position and an end position), where the DLP projector 174 continuously emits light while the pixelated array 180 is translated and the pixelated array 180 is adjusted between a first configuration (i.e., a starting configuration) and a second configuration (i.e., an ending configuration), with any number of intermediate configurations between, as the pixelated array 180 is translated between the first and second positions.

Figure 9:
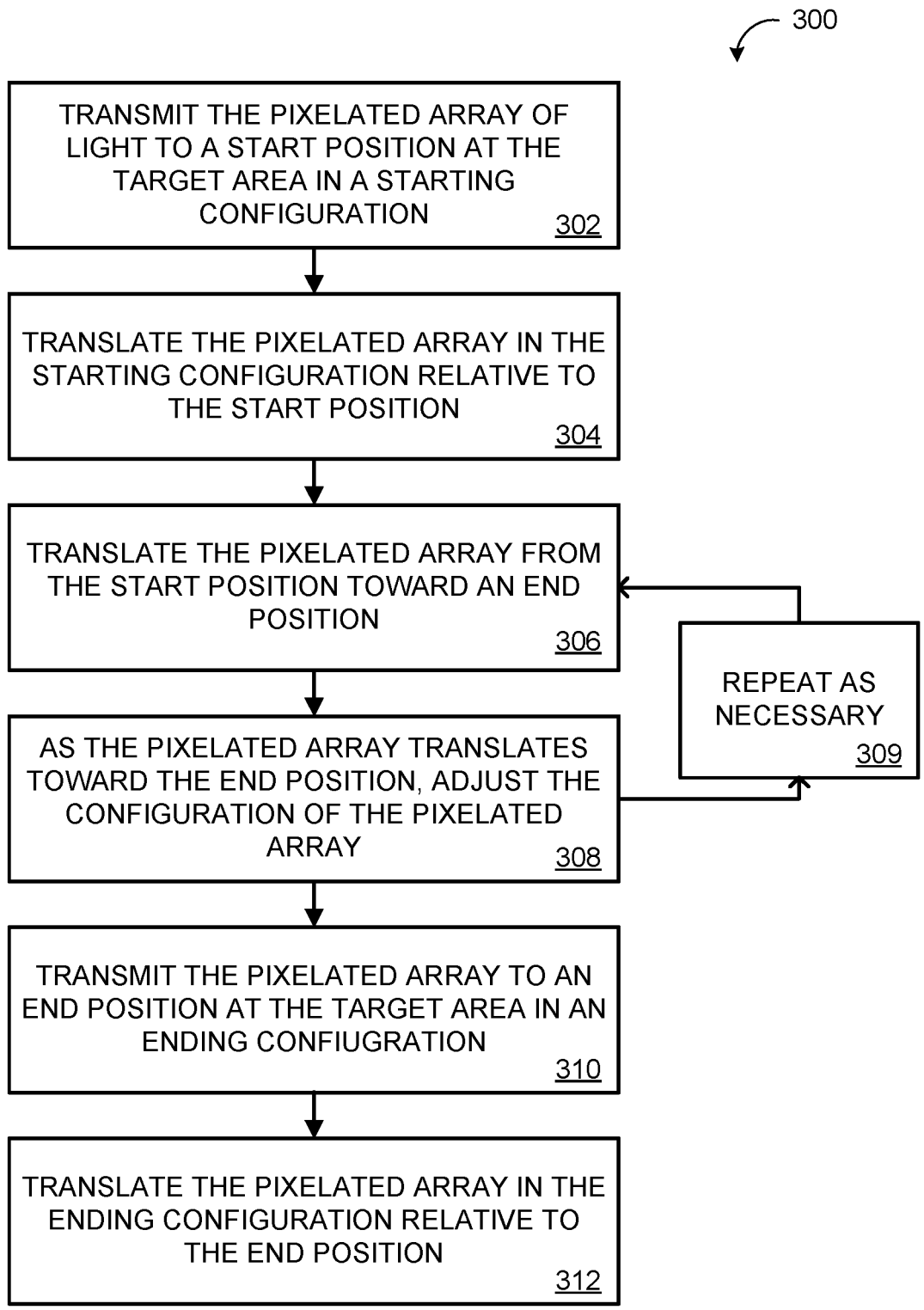
FIG. 9 shows a flow diagram for a scanned exposure scanning strategy of curing a layer of a component fabricated by an additive fabrication device having a curing system according to the present disclosure.

FIG. 9 depicts an example scanned exposure scanning method 300. At step 302, the light source 172 transmits the pixelated array 180 to the target area 182 at a first or start position, with the pixelated array 180 in a first or starting configuration. Here, the pixelated array 180 is rotated at an oblique angle about the projection axis $A_P$ relative to the translation axis $A_T$. At step 304, the curing system 170 translates the pixelated array 180 along the translation axis $A_T$ a threshold distance to achieve the improved resolution at the start position. The curing system 170 transmits the pixelated array 180 in the starting configuration for at least a threshold amount of time for a portion of the target area 182 to cure responsive to the emitted light. At step 306, the curing system 170 translates the pixelated array 180 along the translation axis $A_T$ toward an end position. At step 308, the curing system 170 adjusts the configuration of the pixelated array 180 as the pixelated array 180 translates toward the end position, translating and adjusting the pixelated array 180 at a rate appropriate for portions of the target area 182 to cure. As necessary, at step 309, the curing system 170 repeats steps 306 and 308 to adjust the configuration of the pixelated array 180 as the pixelated array 180 translates. At step 310, the curing system 170 transmits the pixelated array 180 to the target area 182 at the end position with the pixelated array 180 in an ending configuration. At step 312, the curing system 170 translates the pixelated array 180 in the ending configuration a threshold amount to achieve the improved resolution at the end position and for a threshold amount of time for the target area 182 to cure at the end position.

During a quasi-tile exposure scanning method, the target area 182 is exposed to light emitted by the DLP projector 174 when the pixelated array 180 is at a position along the translation axis $A_T$ and in a set configuration and the target area is not exposed to light emitted by the DLP projector 180 as the pixelated array 180 is translated between positions along the translation axis $A_T$. In other words, the pixelated array 180 is transmitted to the target area 182 at a first position along the translation axis $A_T$ and in a first configuration for an amount of time necessary to cure at least a portion of the layer of the finished component C. The pixelated array 180 is then transmitted to the target area 182 at a second position along the translation axis $A_T$ different from the first position and in a second configuration different from the first configuration for an amount of time necessary to cure at least another portion of the layer of the finished component C. This process is repeated as necessary with the pixelated array 180 transmitted in any number of configurations at any number of positions along the translation axis $A_T$. The pixelated array 180 is not transmitted to the target area 182 as the corresponding components of the curing system 170 are moved or as the configuration of the pixelated array 180 is adjusted. When transmitting the pixelated array 180 to the target area 182 at a position along the translation axis $A_T$, the pixelated array 180 is not perfectly stationary, but rather is translated along the translation axis $A_T$ a threshold amount to provide the improved resolution at each position.

Figure 10:
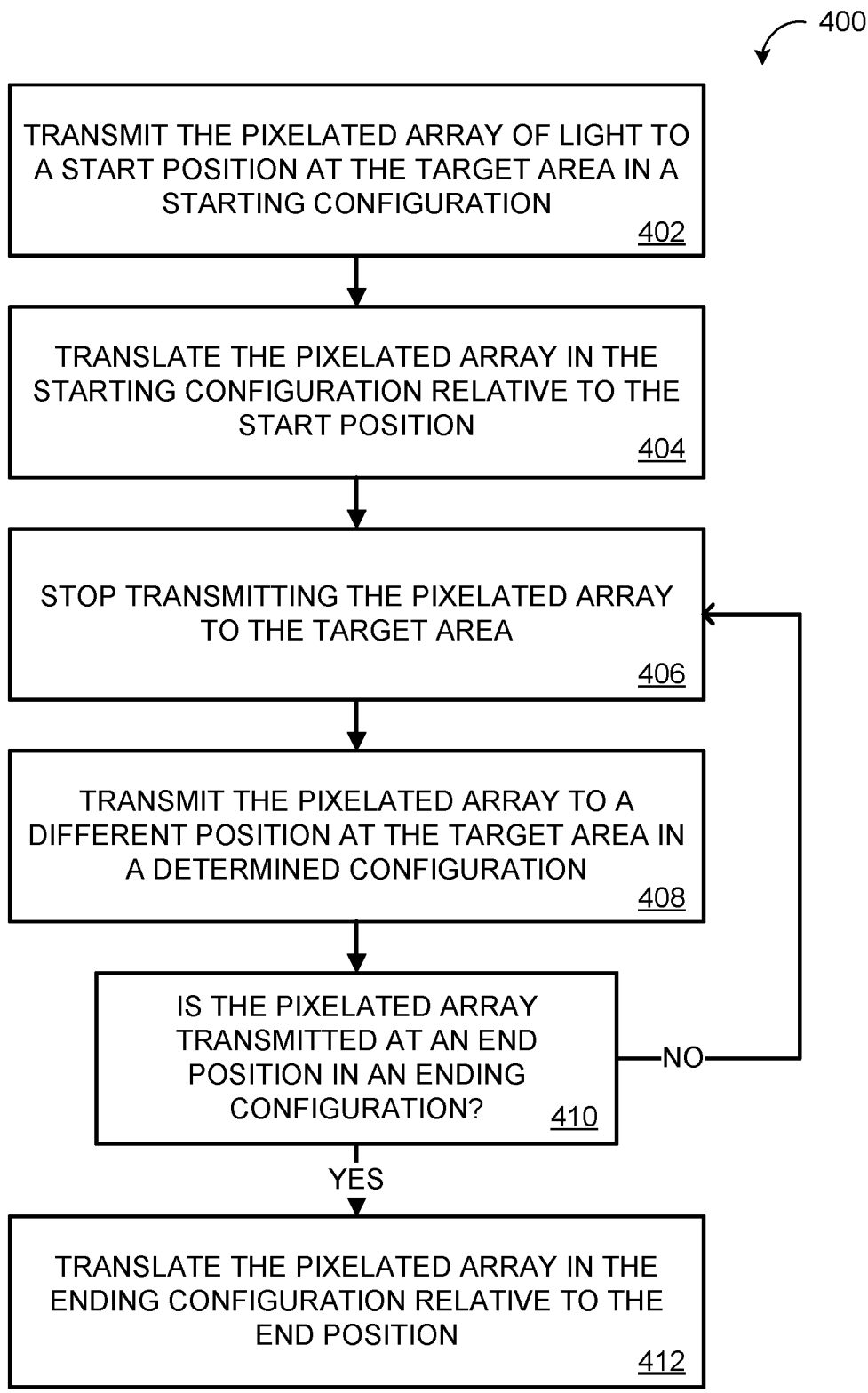
FIG. 10 shows a flow diagram for a quasi-tile exposure scanning strategy of curing a layer of a component fabricated by an additive fabrication device having a curing system according to the present disclosure.

FIG. 10 depicts an example quasi-tile exposure scanning method 400. At step 402, the light source 172 transmits the pixelated array 180 to the target area 182 at a first or start position, with the pixelated array 180 in a first or starting configuration. At step 404, the curing system 170 translates the pixelated array 180 along the translation axis $A_T$ a threshold distance to achieve the improved resolution at the start position. The curing system 170 transmits the pixelated array 180 in the starting configuration for at least a threshold amount of time for a portion of the target area 182 to cure responsive to the emitted light. At step 406, the curing system 170 stops transmitting the pixelated array 180 to the target area 182 so that the curing system 170 may translate the pixelated array 180 along the translation axis $A_T$ without simultaneously transmitting the pixelated array 180. At step 408, the curing system 170 transmits the pixelated array 180 to a position different from the start position at the target area 182 in a determined configuration. For example, the configuration may be determined to be the same as the first configuration or the configuration may be different from the first configuration. At step 410, the curing system 170 determines whether the pixelated array 180 is transmitted at an end position and whether the configuration is an ending configuration. If the pixelated array 180 is not transmitted at the end position in the ending configuration, steps 406 and 408 are repeated until step 410 is true. When the pixelated array 180 is transmitted at the end position in the ending configuration, at step 412, the curing system 170 translates the pixelated array 180 in the ending configuration a threshold amount to achieve the improved resolution at the end position and for a threshold amount of time for the target area 182 to cure at the end position.

When the pixelated array 180 is large enough to cure an entire layer of the finished component C, only a single configuration of the pixelated array 180 may be transmitted to the target area 182. Rather than translating the pixelated array 180 along the translation axis $A_T$ between positions along the translation axis $A_T$, the pixelated array 180 is merely translated a threshold amount (e.g., less than a pixel width along the translation axis $A_T$) to provide improved resolution. A scanning method where a configuration of the pixelated array 180 is translated along the translation axis $A_T$ only a threshold amount to achieve improved resolution may be referred to as a single quasi-tile scanning method.

Figure 11:
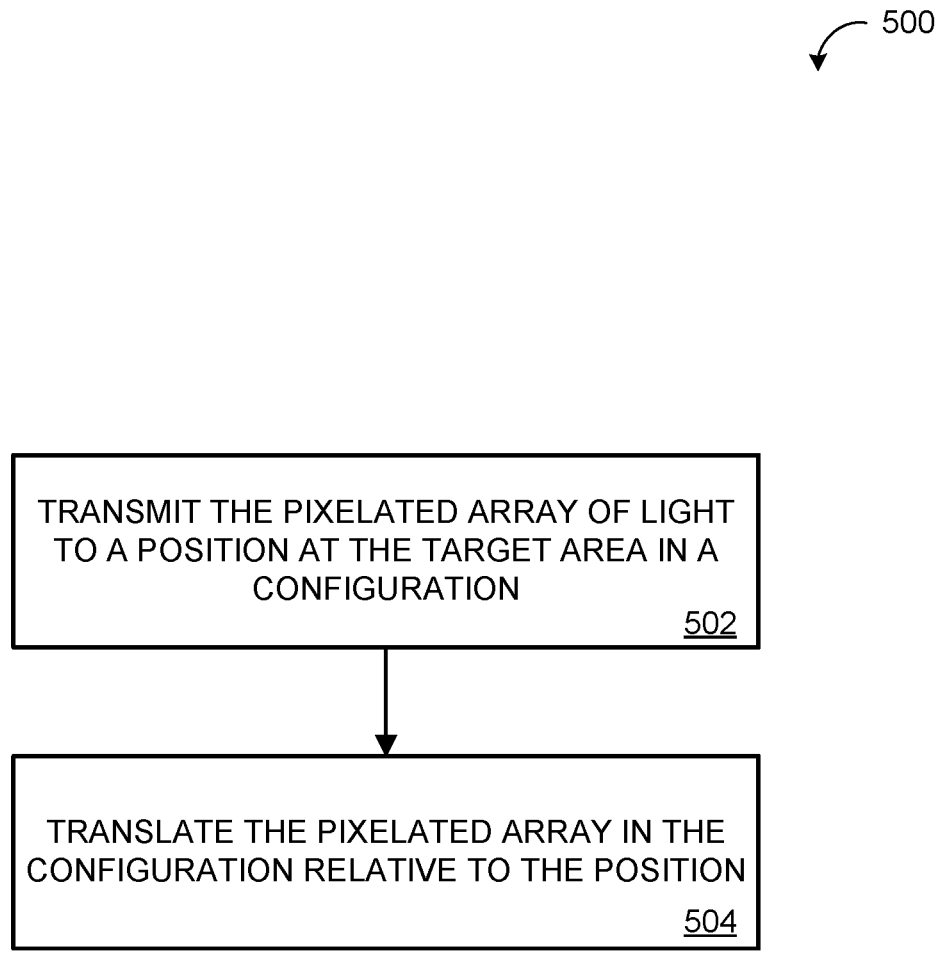
FIG. 11 shows a flow diagram for a single quasi-tile exposure scanning strategy of curing a layer of a component fabricated by an additive fabrication device having a curing system according to the present disclosure.

FIG. 11 depicts an example single quasi-tile scanning method 500. At step 502, the curing system 170 transmits the pixelated array 180 to the target area 182 at a position and in a configuration. At step 504, the curing system 170 translates the pixelated array 180 along the translation axis AT a threshold amount to achieve the improved resolution for the cured layer.

As discussed above, the curing system 170 exposes a portion of the liquid photopolymer resin R to light at a wavelength suitable for curing the resin R for a threshold amount of time in order to cure the portion of the resin. In other words, for a pixel 181a of the pixelated array 180 to translate to a portion of the cured layer of resin R, the pixel 181a must be activated for a threshold amount of time. Thus, the print time (i.e., the time it takes for a layer of the finished component C to be exposed to the threshold amount of light) is dependent upon such factors as the size of the pixelated array 180, the size of a pixel 181a, the area to be cured, and at least in the case of the scanned exposure scanning method, the rate at which the pixels 181a may be updated as the pixelated array 180 is translated along the translation axis $A_T$. For example, the liquid photopolymer resin R may have a fluence value (the amount of energy of acitinic radiation a given area of the resin must receive to cure) and the DMD 176 may have a maximum pixel update frequency. If the pixelated array 180 is capable of exposing a portion of the resin to enough acitinic radiation to satisfy the fluence value faster than the pixelated array 180 can be translated and/or faster than the DMD 176 can update the pixels 181a, the print time may be limited by such factors. In other words, despite other capabilities of the curing system 170, the print time is dependent upon satisfying the fluence value at each portion of the layer to be cured.

Figure 12:
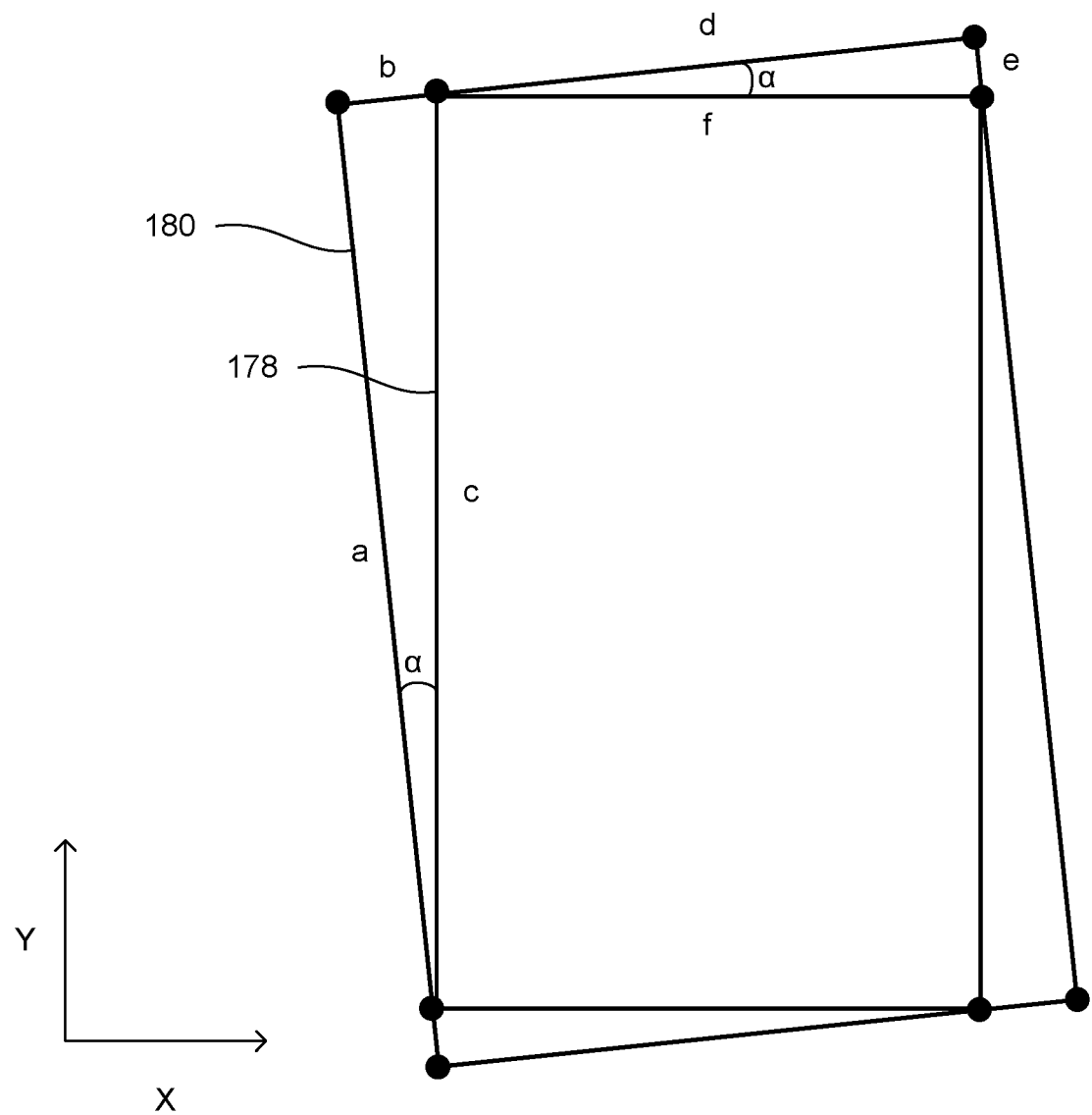
FIG. 12 shows the printable area provided by a stationary pixelated array.
Figure 13:
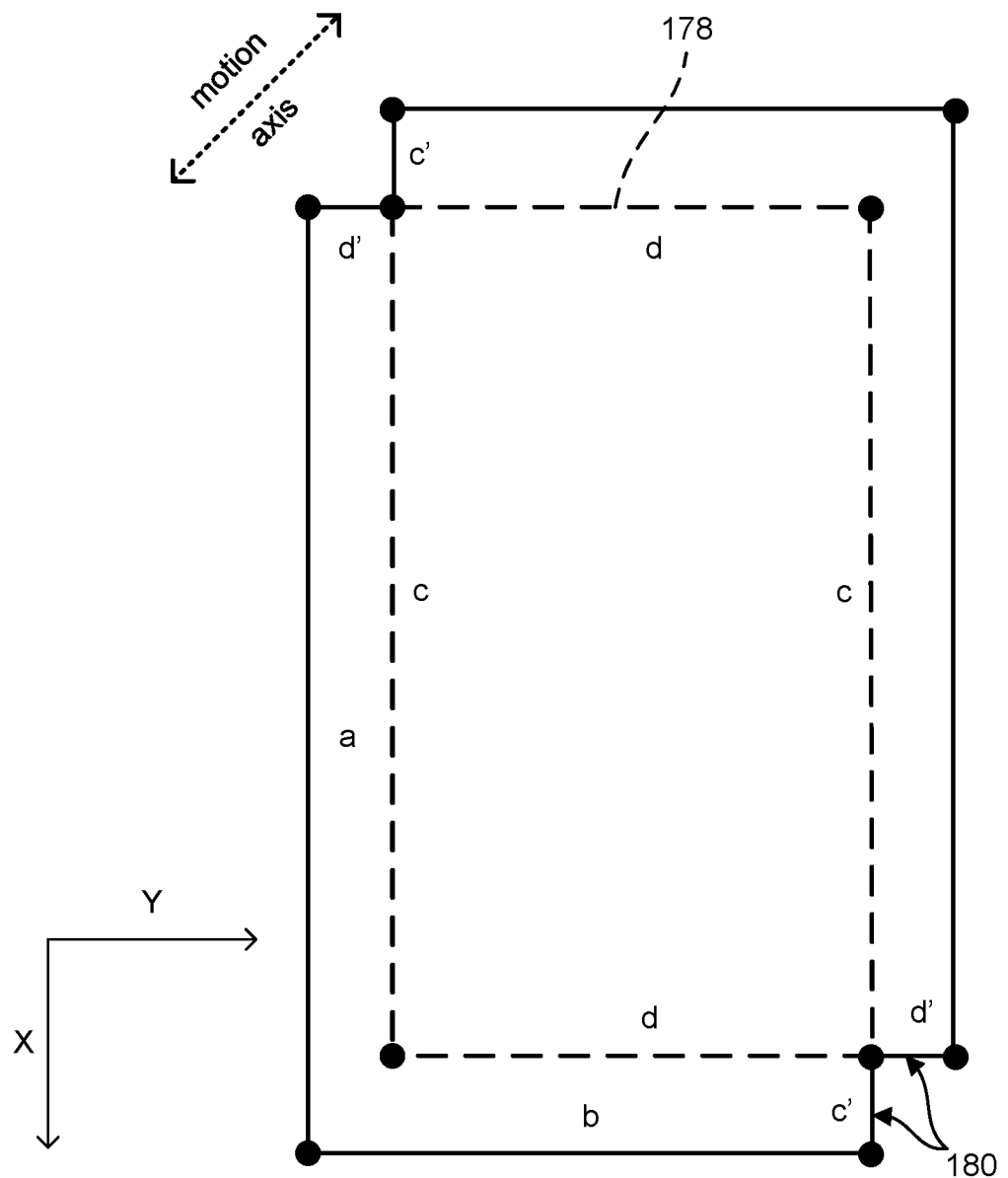
FIG. 13 shows the printable area provided by a pixelated array translated along a translation axis that is at an oblique angle relative to the pixelated array.

Additionally, it should be understood that the total printable area of the curing system 170 may be at least incrementally smaller than the area of the target area 182 which the pixelated array 180 is configured to cover. As shown in FIGS. 12 and 13, the translation of the pixelated array 180 along the translation axis $A_T$ means that the printable area (i.e., the area with improved resolution) is a portion of the coverage area. FIG. 12 depicts a printable area 178 as a portion of the pixelated array 180 where the printable area 178 is represented by a rectangular area perpendicular to the translation axis $A_T$. FIG. 13 depicts a printable area as a portion of the pixelated array 180 where the printable area 178 is represented by a rectangular area fully within the range of motion of the pixelated array 180 along the translation axis $A_T$.

Furthermore, there is a dependence between the drift number N and utilization area of the DMD 176 when aligning the pixelated array 180, the printable area 178, and translation axis $A_T$, such as shown in FIG. 13. A smaller drift number N results in a higher utilization fraction (how much of the DMD 176 may be used to reflect the pixelated array 180). However, even a high drift number (such as 40 or higher) may still allow for a high percentage (such as 98 percent) of the DMD to be utilized to provide the printable area 178. The aspect ratio of the printable area 178 also is dependent upon the drift number N because of the increased distance the pixelated array 180 is translated along the translation axis $A_T$ to complete a drift cycle measured against the same distance the pixelated array 180 travels across the translation axis $A_T$. However, the aspect ratio of the printable area 178 may remain close to a native aspect ratio of the DMD 176. For example, the DMD 176 may have a native aspect ratio of 1.778 and an aspect ratio of a pixelated array having a drift number of 40 is above 1.74. In other words, although tilting the pixelated array 180 relative to the translation axis $A_T$ results in a smaller printable area 178 than what would be achievable by a curing system using a non-tilted pixelated array, such area losses are minimal. Optionally, a border of non-printable area may be established around the printable area 178, resulting in a cropped printable area 186.

Print time can then be calculated as a function of fluence and the distance the pixelated array 180 is translated along the translation axis $A_T$ based on the translation angle θ, the aspect ratio of the total projected area as measured in pixels 181*a*, and the dimension of the printable area across the translation axis $A_T$. The local exposure time, which the pixelated array 180 must spend illuminating any given point in order to cure the resin at the given point may be determined as the fluence of the resin divided by the cure plane irradiance. The maximum velocity at which the pixelated array 180 may be translated along the translation axis may be determined as the width of the area to be cured divided by the local exposure time because translating the pixelated array 180 faster than that speed would mean that insufficient time is spent at each pixel 181*a* to satisfy the fluence value.

For a quasi-tile exposure scanning method the print time can be determined as the active exposure time plus the jog time between tiles, where the active exposure time is given by the local exposure time multiplied by the minimum number of configurations of the pixelated array 180 required in order to fully cover the print area. The jog time is given by the total distance along the translation axis that the pixelated array 180 is translated divided by the speed at which the pixelated array 180 is translated. Because the pixelated array 180 must be translated at least a threshold amount to provide the improved resolution, the total distance travelled along the translation axis AT cannot be less than or equal to zero.

For a scanned exposure scanning method, the print time can be determined as the local exposure time in the starting position plus the local exposure time in the ending position, plus the time spent translating the pixelated array 180 between the start and end positions. The start and end local exposure times are both equal to the local exposure time. The time spent translating the pixelated array between the start and end positions can be determined as the scanned distance divided by the scanning speed. The scanning distance is the total distance along the translation axis that the pixelated array 180 is translated, and the scanning speed is less than or equal to the maximum velocity at which the pixelated array 180 may be translated along the translation axis to satisfy the fluence value, as discussed above.

Figure 14:
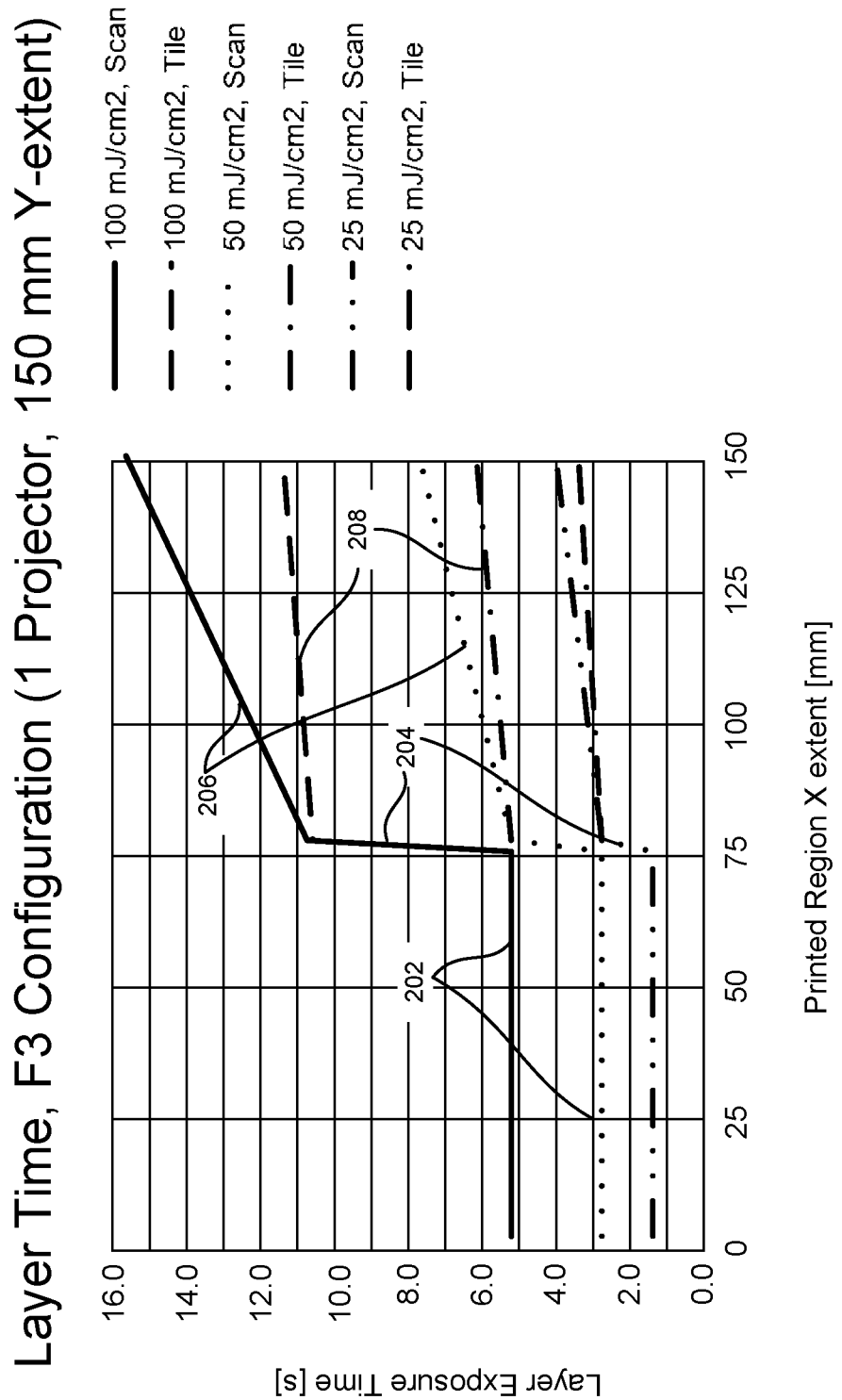
FIGS. 14 and 15 are graphs showing the print time of a curing system utilizing different scanning strategies for liquid photopolymer resins having different fluence values.
Figure 15:
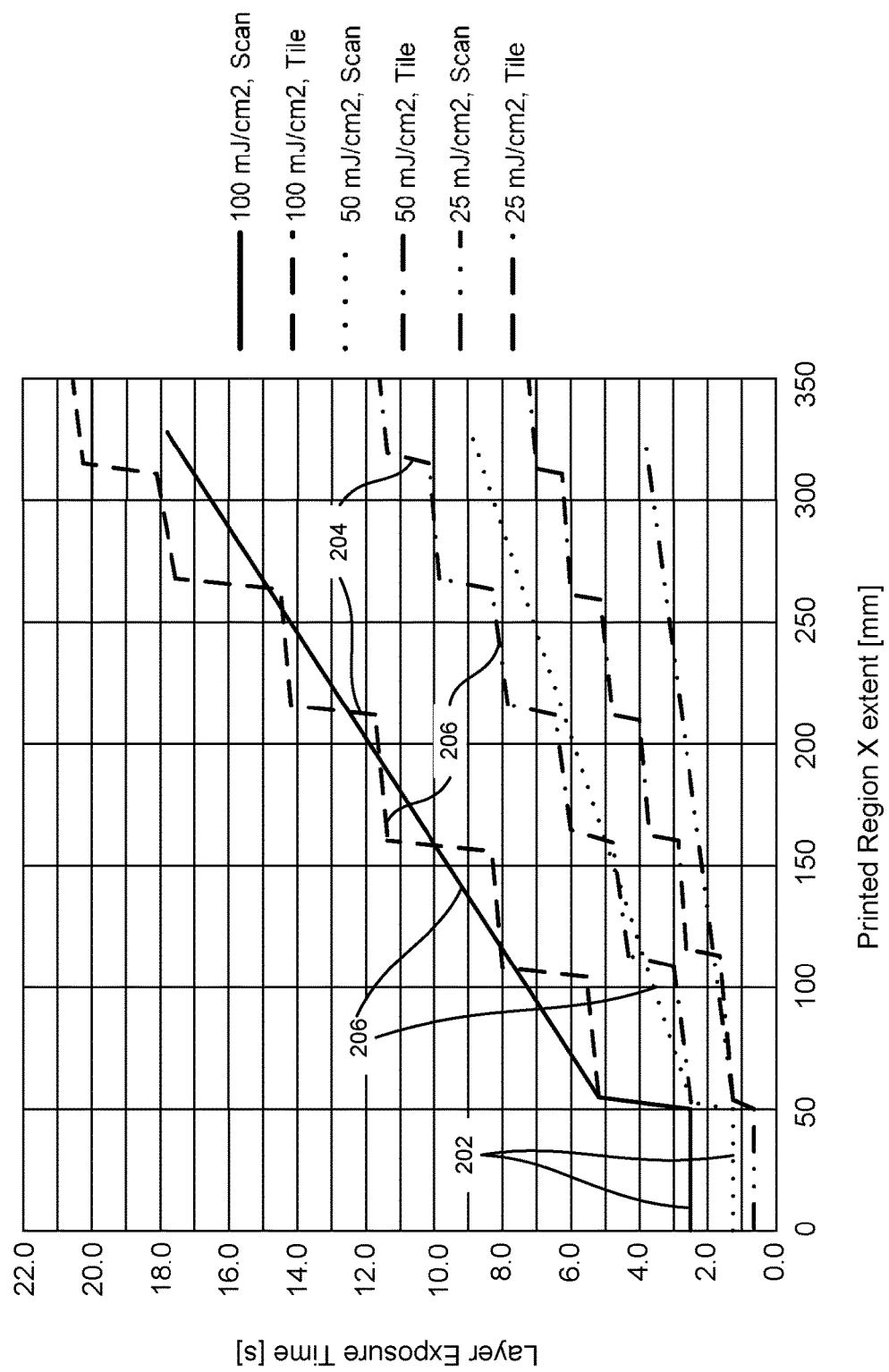

FIGS. 14 and 15 depict graphs comparing the print time of a layer of a finished component via a curing system 170 based on the scanning method and the fluence value of the resin. The graph of FIG. 14 represents the capabilities of a 3D Printer A and FIG. 15 represents the capabilities of a 3D Printer B, which are represented by the parameters described in Table 1 below. The capabilities (e.g., outputs) of such 3D printers are represented by Table 2 below. The intercept of the respective plots with the Y-axis of the graphs of FIGS. 14 and 15 represent the local exposure time for the respective resins and the slope of the plots represents the maximum velocity at which the pixelated array 180 may be translated along the translation axis. The portions 202 of the line plots represent times during a scanning method where the pixelated array 180 illuminates the target area at a start position along the translation axis in a starting configuration and the portions 204 represent the times when the pixelated array 180 in its given configuration is translated by a threshold amount to achieve the improved resolution and cure incrementally additional portions of the resin. The portions 206 of the line plots represent times during a scanned exposure scanning method where the pixelated array 180 is translated continuously along the translation axis $A_T$ at a rate suitable for the liquid photopolymer resin to cure as the pixelated array is translated and adjusted between configurations. The portions 208 of the line plots represent times during a quasi-tile exposure scanning method where the pixelated array 180 illuminates an additional portion of the resin R at a second position along the translation axis $A_T$.

TABLE 1

| Input Parameters: | 3D Printer A | 3D Printer B | Units |
|---|---|---|---|
| Projected optical power | 2.5 | 2.5 | [W] |
| Projector-to-resin optical efficiency | 1 | 1 | — |
| Fluence Required | 100 | 100 | [mJ/cm2] |
| Print area Y dimension | 150 | 200 | [mm] |
| Number of projectors along Y | 1 | 2 | [integer] |
| Overlap between adjacent projectors | N/A | 5 | [mm] |
| X jog velocity for tile exposure | 100 | 100 | [mm/s] |
| Projector Aspect ratio | 1.778 | 1.778 | — |
| Projector Vertical Pixels | 1080 | 1080 | [ea] |
| Projector Horizontal Pixels | 1920 | 1920 | [ea] |
| Tilt Angle | 3.0 | 3.0 | [deg] |
| Pixels of Y drift per quasi-tile | 1 | 1 | [ea] |

TABLE 2

| Outputs: | 3D Printer A | 3D Printer B | Units |
|---|---|---|---|
| Cropped image X dimension | 78.8 | 53.9 | [mm] |
| Cropped image Y dimension | 150 | 102.5 | [mm] |
| Cropped projected area | 118 | 55 | [cm2] |
| Percent of area lost to crop | 11% | 11% | — |
| Projected Irradiance | 18.8 | 40.2 | [mW/cm2] |
| Projected pixel pitch | 80.2 | 54.8 | [µm] |
| X axis travel per pixel of drift | 1.5 | 1.0 | [mm] |
| X axis travel per quasi tile | 1.5 | 1.0 | [mm] |
| Effective image width per quasi-tile | 77.3 | 52.8 | [mm] |

Figure 16:
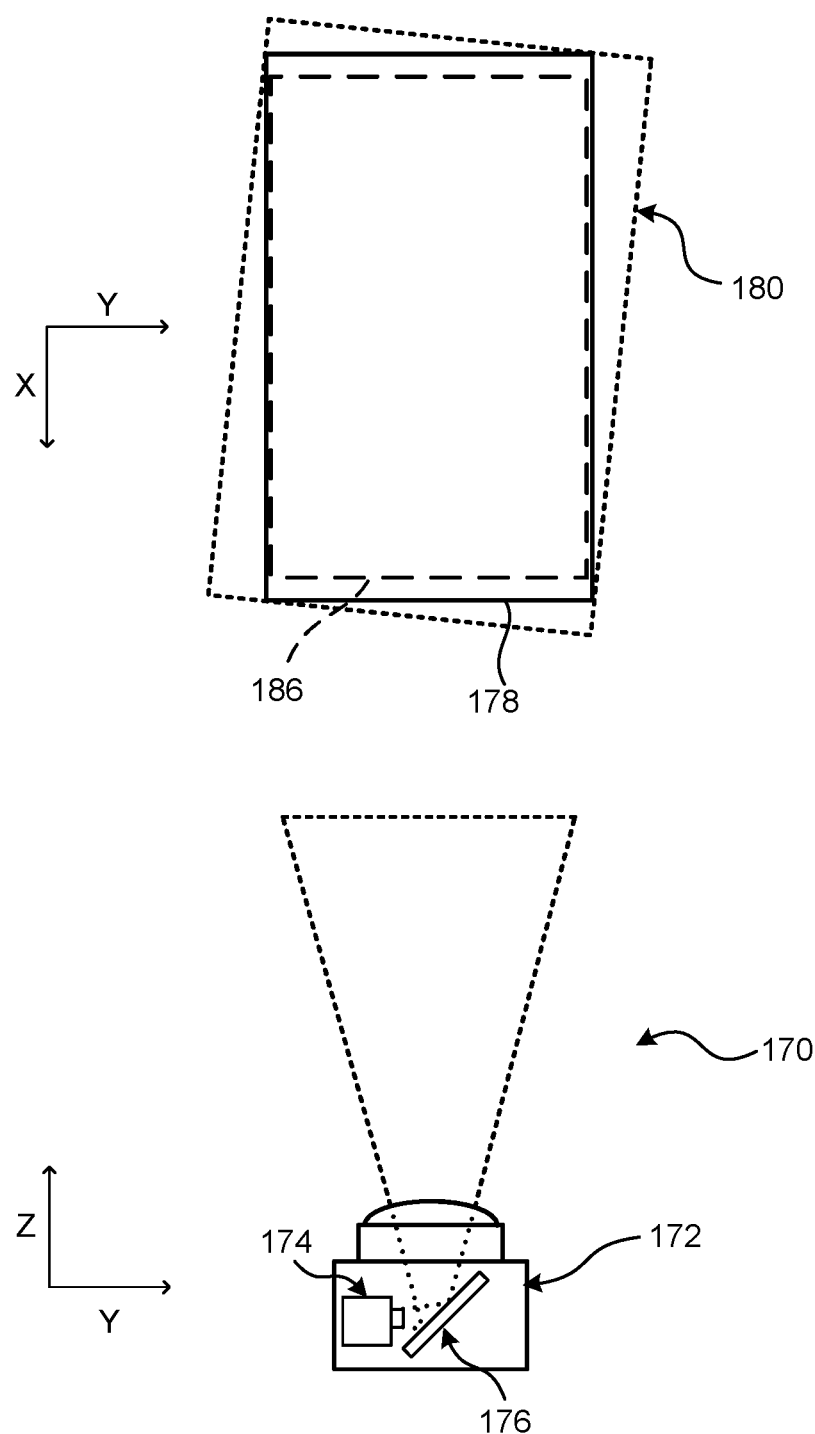
FIG. 16 is a plan view of a curing system having a single light source.
Figure 17:
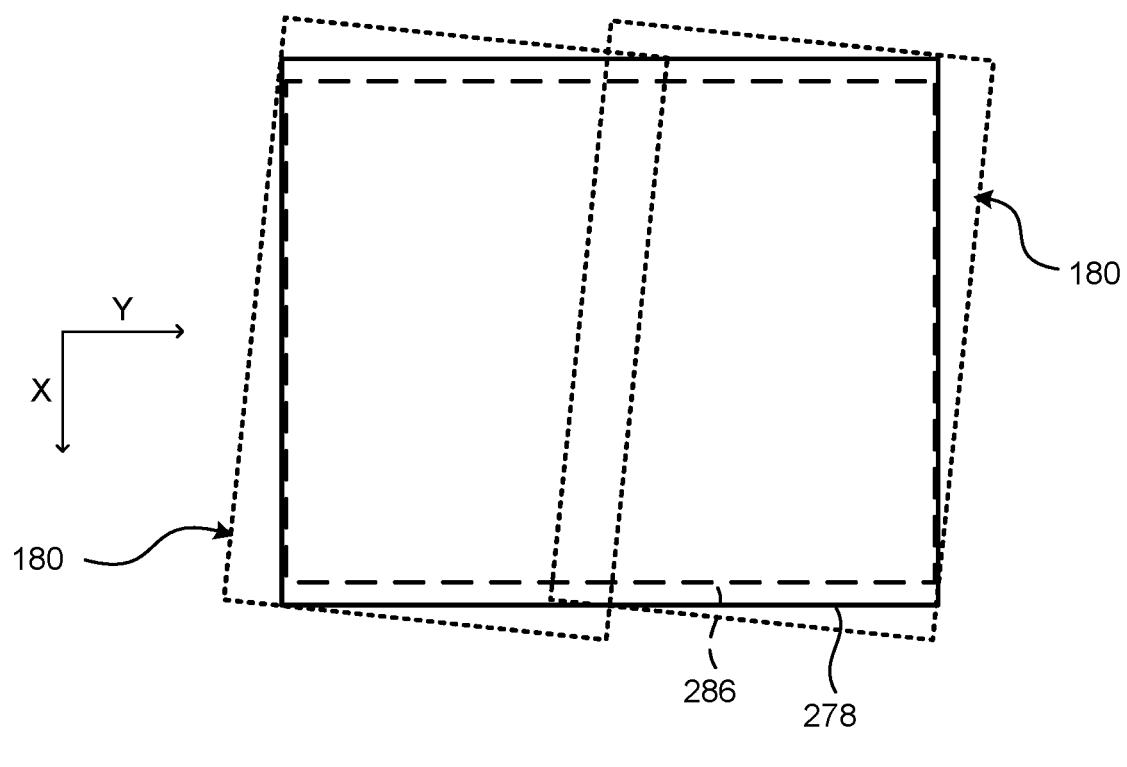
FIG. 17 is a plan view of a curing system having two light sources.
Figure 17:
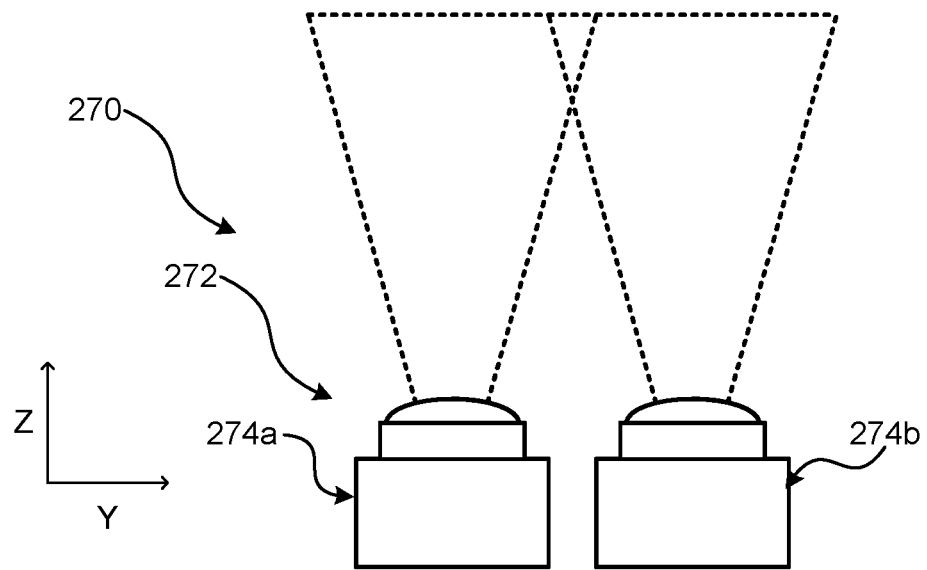

As shown in FIG. 16 and as described throughout, the curing system 170 may have a single light source 172, such as a DLP projector 174 that emits light for the DMD 176 to reflect as the pixelated array 180 to illuminate the target area 182. However, as shown in FIG. 17, a curing system 270 may include a plurality of light sources 272, such as a first DLP projector 274a and a second DLP projector 274b. The first DLP projector 274a and the second DLP projector 274b may each illuminate light that together combine to provide the pixelated array 180. The pixelated array 180 may be transmitted to the target area 182 in any suitable manner, such as via a first and second DMD, a single DMD that receives light from both the first DLP projector 274a and the second DLP projector 274b. As shown in FIG. 17, each light source 272 illuminates a respective pixelated array 180 tilted relative to the translation axis $A_T$ and that combine to provide the printable area 278 and cropped printable area 286. The curing system 270 otherwise complies with all aspects of the present disclosure, but emitting light via a plurality of DLP projectors may result in such benefits as being able to cure a larger layer of a finished component C, faster curing time, and/or enhanced resolution. For example, the pixelated array 180 is still rotated by a translation angle θ and translated along only a single translation axis $A_T$.

A number of implementations have been described. Nevertheless, it will be understood that various modifications may be made without departing from the spirit and scope of the disclosure. Accordingly, other implementations are within the scope of the following claims.

What is claimed is:

1. A curing system for an additive fabrication system, the curing system comprising:
    a basin configured to receive a photopolymer resin;
    an ultraviolet light source configured to selectively emit ultraviolet light, the ultraviolet light defining a pixelated array illuminating at least a portion of the photopolymer resin, the pixelated array including a first array axis and a second array axis oriented perpendicular to the first array axis; and
    a translating device configured to translate the pixelated array along a translation axis at an oblique angle greater than five degrees relative to the first array axis, the translating device configured to translate the pixelated array according to a program including the operations of:
        maintaining the pixelated array at a first position along the translation axis for at least a first threshold period of time;
        maintaining the pixelated array at a second position spaced from the first position along the translation axis for at least a second threshold period of time; and
        translating the pixelated array along the translation axis between the first position and the second position at a translation rate.

2. The curing system of claim 1, wherein the ultraviolet light source comprises a digital light processing (DLP) projector.

3. The curing system of claim 1, wherein the ultraviolet light source comprises at least one of (i) a liquid crystal display (LCD), (ii) a light-emitting diode (LED) array, (iii) an organic light-emitting diode (OLED) array, or (iv) a microLED array.

4. The curing system of claim 1, wherein a reflector device reflects the ultraviolet light emitted from the ultraviolet light source at the photopolymer resin, the reflector device configured to establish the pixelated array.

5. The curing system of claim 4, wherein the reflector device comprises a digital micromirror device (DMD).

6. The curing system of claim 1, wherein the pixelated array represents at least a portion of a build layer of a fabricated component.

7. The curing system of claim 1, wherein the pixelated array is in a first configuration at the first position and the pixelated array is in a second configuration different from the first configuration at the second position.

8. The curing system of claim 7, wherein, as the translating device translates the pixelated array between the first position and the second position, the pixelated array transforms between the first configuration and the second configuration.

9. The curing system of claim 1, wherein, as the translating device translates the pixelated array between the first position and the second position, the ultraviolet light source does not emit ultraviolet light.

10. The curing system of claim 1, wherein, as the translating device translates the pixelated array between the first position and the second position, the ultraviolet light source emits ultraviolet light.

11. The curing system of claim 1, wherein the translation rate is configured to allow at least a portion of the photopolymer resin illuminated by the pixelated array between the first position and the second position to cure.

12. The additive fabrication system of claim 1, wherein:
    the first threshold period of time is configured to cure at least a portion of the photopolymer resin illuminated by the pixelated array at the first position; and
    the second threshold period of time is configured to cure at least a portion of the photopolymer resin illuminated by the pixelated array at the second position.

13. An additive fabrication system comprising:
    a dispensing system;
    a base supporting a basin, the basin configured to receive a photopolymer resin from the dispensing system;
    a build platform operable to traverse a vertical direction between an initial position adjacent to a bottom surface of the basin and a finished position spaced apart from the bottom surface of the basin; and
    a curing system housed within the base and configured to transmit actinic radiation into the basin to incrementally cure layers of the photopolymer resin onto the build platform to fabricate a component, the curing system comprising:
        an ultraviolet light source configured to selectively emit ultraviolet light, the ultraviolet light defining a pixelated array illuminating at least a portion of the photopolymer resin, the pixelated array including a first array axis and a second array axis oriented perpendicular to the first array axis; and
        a translating device configured to translate the pixelated array along a translation axis at an oblique angle greater than five degrees relative to the first array axis, the translating device configured to translate the pixelated array according to a program including the operation of:
            maintaining the pixelated array at a first position along the translation axis for at least a first threshold period of time;
            maintaining the pixelated array at a second position spaced from the first position along the translation axis for at least a second threshold period of time; and
            translating the pixelated array along the translation axis between the first position and the second position at a translation rate.

14. The additive fabrication system of claim 13, wherein the ultraviolet light source comprises a digital light processing (DLP) projector.

15. The additive fabrication system of claim 13, wherein the ultraviolet light source comprises at least one of (i) a liquid crystal display (LCD), (ii) a light-emitting diode (LED) array, (iii) an organic light-emitting diode (OLED) array, or (iv) a microLED array.

16. The additive fabrication system of claim 13, wherein a reflector device reflects the ultraviolet light emitted from the ultraviolet light source at the photopolymer resin, the reflector device configured to establish the pixelated array.

17. The additive fabrication system of claim 16, wherein the reflector device comprises a digital micromirror device (DMD).

18. The additive fabrication system of claim 13, wherein the pixelated array represents at least a portion of a build layer of a fabricated component.

19. The curing system of claim 1, wherein:
the first threshold period of time is configured to cure at least a portion of the photopolymer resin illuminated by the pixelated array at the first position; and
the second threshold period of time is configured to cure at least a portion of the photopolymer resin illuminated by the pixelated array at the second position.

20. A method for curing a photopolymer resin using a curing system comprising an ultraviolet light source, the method comprising:
providing a curing system including (i) a basin containing a photopolymer resin, (ii) an ultraviolet light source configured to emit ultraviolet light, and (iii) a translating device;
emitting ultraviolet light from the ultraviolet light source at a first position along a translation axis for at least a first threshold period of time to cure at least a first portion of the photopolymer resin, the ultraviolet light defining a pixelated array including a first array axis and a second array axis oriented perpendicular to the first array axis;
translating, via the translating device, the pixelated array along the translation axis from the first position to a second position spaced from the first position, the pixelated array translated along the translation axis between the first position and the second position at a translation rate and at an oblique angle greater than five degrees relative to the first array axis; and
maintaining the pixelated array maintained at the second position for at least a second threshold period of time to cure at least a second portion of the photopolymer resin different from the first portion.

* * * * *